United States Patent
Boesgaard

(10) Patent No.: US 11,902,417 B2
(45) Date of Patent: Feb. 13, 2024

(54) COMPUTER-IMPLEMENTED METHOD OF PERFORMING FORMAT-PRESERVING ENCRYPTION OF A DATA OBJECT OF VARIABLE SIZE

(71) Applicant: PII GUARD APS, Greve (DK)

(72) Inventor: Martin Staal Boesgaard, Solrod Strand (DK)

(73) Assignee: PII GUARD APS, Greve (DK)

( * ) Notice: Subject to any disclaimer, the term of this patent is extended or adjusted under 35 U.S.C. 154(b) by 85 days.

(21) Appl. No.: 16/764,121

(22) PCT Filed: Nov. 14, 2018

(86) PCT No.: PCT/EP2018/081210
§ 371 (c)(1),
(2) Date: May 14, 2020

(87) PCT Pub. No.: WO2019/096837
PCT Pub. Date: May 23, 2019

(65) Prior Publication Data
US 2020/0396056 A1    Dec. 17, 2020

(30) Foreign Application Priority Data
Nov. 14, 2017 (EP) ..................................... 17201619

(51) Int. Cl.
*H04L 9/06* (2006.01)
*H03M 7/30* (2006.01)
*H04L 9/32* (2006.01)

(52) U.S. Cl.
CPC ........ *H04L 9/0618* (2013.01); *H03M 7/6005* (2013.01); *H03M 7/607* (2013.01);
(Continued)

(58) Field of Classification Search
CPC ............... H04L 9/0618; H04L 2209/20; H04L 2209/34; G06F 21/6245
See application file for complete search history.

(56) References Cited

U.S. PATENT DOCUMENTS 6,189,095 B1    2/2001 Coppersmith et al.
9,635,011 B1 *  4/2017 Wu ....................... H04L 9/0861
(Continued)

OTHER PUBLICATIONS

Extended European Search Report from corresponding EP Application No. 17201619.8, dated Apr. 23, 2018.
(Continued)

*Primary Examiner* — Ellen Tran
(74) *Attorney, Agent, or Firm* — Workman Nydegger

(57) ABSTRACT

A computer-implemented method of encrypting a data object of variable size utilizing an inner encryption algorithm can take a variable size input and of outputting, as its output, an encrypted version of the variable size input. The method comprises compressing or encoding the data object in its totality to obtain a compressed or encoded version of the data object in a format compatible with the inner encryption algorithm, encrypting, by the inner encryption algorithm, the compressed or encoded version of the data object to obtain an encrypted version of the data object, and decompressing or decoding the encrypted version of the data object to obtain a decompressed or decoded version of the encrypted version of the data object, which constitutes a format-preserved encrypted version of the data object.

14 Claims, 21 Drawing Sheets

(52) U.S. Cl.
    CPC ............ *H03M 7/70* (2013.01); *H04L 9/3242* (2013.01); *H04L 2209/20* (2013.01); *H04L 2209/34* (2013.01)

(56) References Cited

U.S. PATENT DOCUMENTS

| | | | | |
|---|---|---|---|---|
| 9,773,243 | B1* | 9/2017 | Spies | G07F 7/1016 |
| 2011/0103579 | A1 | 5/2011 | Martin et al. | |
| 2013/0067225 | A1* | 3/2013 | Shochet | G06F 21/6209 713/165 |
| 2013/0339252 | A1* | 12/2013 | Pauker | H04L 9/0625 705/64 |
| 2014/0108813 | A1* | 4/2014 | Pauker | G06F 21/6218 713/189 |
| 2016/0247150 | A1 | 8/2016 | Spies et al. | |
| 2017/0039568 | A1* | 2/2017 | Tunnell | G06F 21/33 |
| 2017/0214521 | A1* | 7/2017 | Busch | H04L 9/0618 |

OTHER PUBLICATIONS

International Search Report and Written Opinion from PCT Application No. PCT/EP2018/081210, dated Feb. 22, 2019.
Huffman, "A Method for the Construction of Minimum-Redundancy Codes," Proceedings of the I.R.E., Sep. 31, 1952, pp. 1098-1101.
Knuth, "Dynamic Huffman Coding," Journal of Algorithms, vol. 6, No. 2, at least as early as Dec. 31 of 1985, pp. 163-180.
Witten et al., "Arithmetic Coding for Data Compression," Communications of the Association for Computing Machinery, vol. 30, No. 6, Jun. 30, 1987, pp. 520-540.
Vitter, "Design and Analysis of Dynamic Huffman Codes," Journal of the Association for Computing Machinery, vol. 34, No. 4, Oct. 31, 1987, pp. 825-845.
Spies, "Format Preserving Encryption," Database and Network Journal, retrieved from www.voltage.com, Dec. 31, 2008, 8 Pages.
Bellare, "Format-Preserving Encryption," retrieved from the Internet https://eprint.iacr.org/2009/251.pdf, Dec. 31, 2009, 25 Pages.
"Compression and Encryption," Superuser Community Blog, Mar. 21, 2011, retrieved from https://blog/superuser.com/2011/03/21/compression-and-encryption/, retrieved on Apr. 23, 2018, 4 Pages.
Law Abiding Citizen, "Packers—Executable Compression and Data Obfuscation, Malware" retrieved from the Internet Apr. 23, 2018 from https://0X00sec.org/t/packers-executable-compression-and-data-obfuscation/847, posted Jul. 29, 2016, 22 Pages.
Canard Sebastien et al: "Running Compression Algorithms in the Encrypted Domain: A Case-Study on the Homomorphic Execution of RLE", 2017 15th Annual Conference on Privacy, Security and Trust (PST), IEEE, Aug. 28, 2017, pp. 283-28309.
European Examination Report from corresponding European Patent Application No. 18 800 189.5-1207, Nov. 3, 2022.
Stackoverflow.com, "Is there a simpler way to encrypt an ascii based code that is compatible with punctuation than to make a dictionary with the ascii values in Python?", stackoverflow.com/questions, May 31, 2017, 3 pages, URL: https://stackoverflow.com/questions/43639183/is-there-a-simpler-wa••to-encrypt-an-ascii-based-code-that-is-compatible-with-pu [retrieved on Nov. 15, 2023].
Summons to attend oral proceedings from Corresponding European Patent Application No. EP18800189.5, dated Nov. 24, 2023.

* cited by examiner

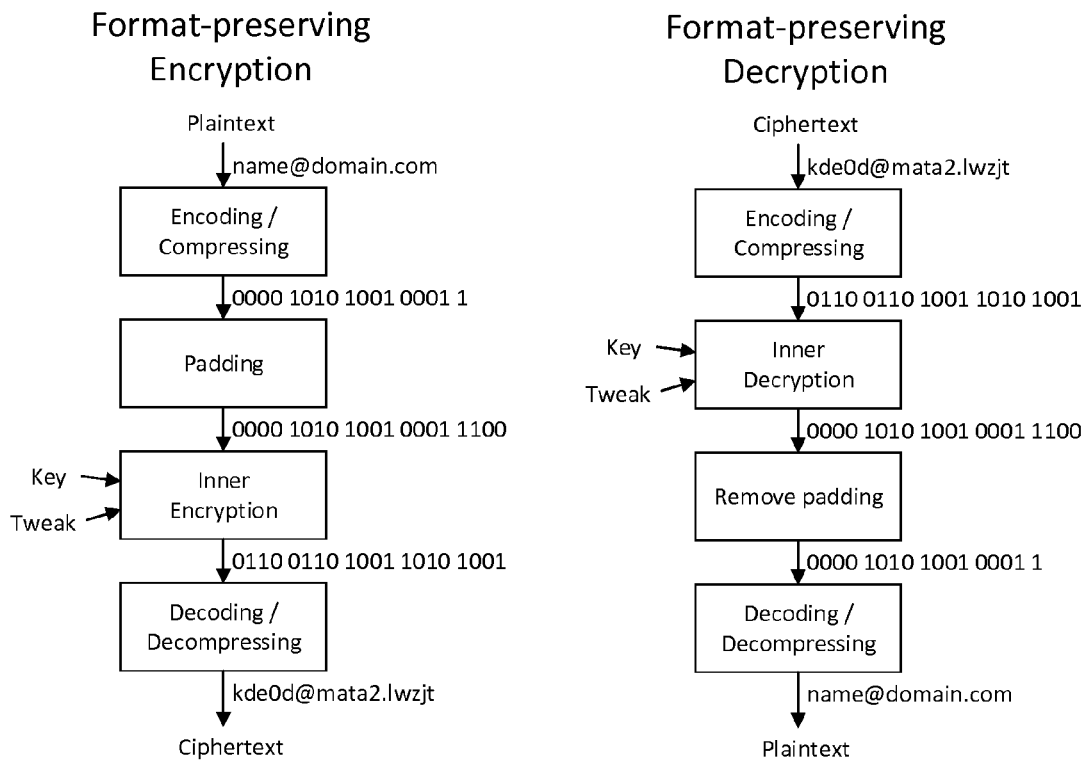
Figure 14
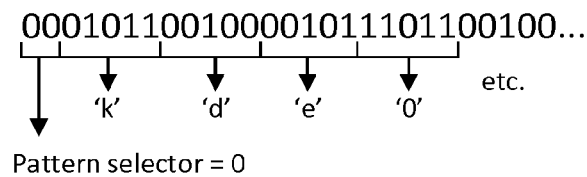
Figure 15
Pattern selector table:
| | | | | | | |
|---|---|---|---|---|---|---|
| 0: | 1/3 | @ | 1/3 | . | 1/3 | |
| 1: | 1/4 | @ | 2/4 | . | 1/4 | |
| 2: | 2/4 | @ | 1/4 | . | 1/4 | |
| 3: | 1/4 | @ | 1/4 | . | 1/4 | . | 1/4 |
Figure 16 kde0d|mata2|lwzjt
 1/3   1/3   1/3
        ↓
kde0d@mata2.lwzjt

Figure 17

| Symbol | Encoded |
|--------|---------|
| a | 001 |
| e | 1 |
| g | 0001 |
| m | 0000 |
| s | 01 |

| m | e | s | S | a | g | e |
|---|---|---|---|---|---|---|
|0000|1|01|01|001|0001|1|

| Symbol | Encoded interval |
|--------|------------------|
| a | 0.0 – 0.2 |
| i | 0.2 – 0.4 |
| p | 0.4 – 0.6 |
| z | 0.6 – 1.0 |

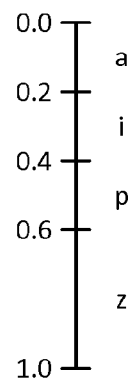
Figure 31
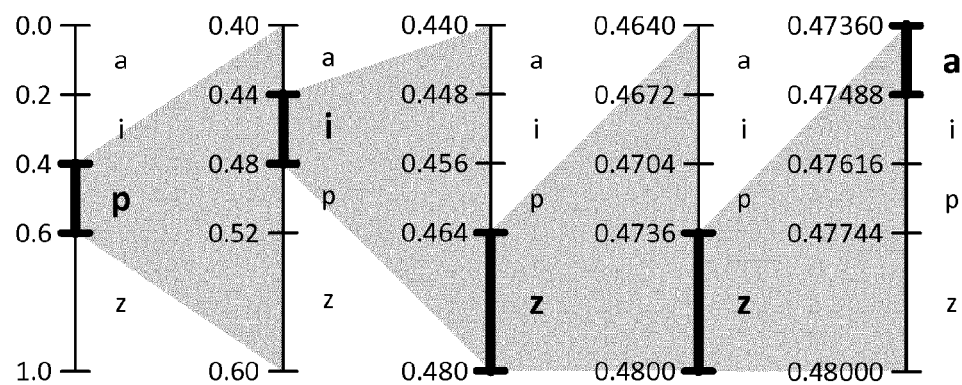
Figure 32
| Decimal rational number | Binary rational number |
|---|---|
| 0.47360 | 0.01111001001111011101 |
| 0.47488 | 0.01111001100100011011 |
Figure 33

| Symbol | Encoded value | Encoded domain |
|---|---|---|
| a | 6 | 9 |
| e | 0 | 3 |
| g | 7 | 9 |
| m | 8 | 9 |
| s | 1 | 3 |

| Symbol | Encoded value | Encoded domain | Value | Domain |
|---|---|---|---|---|
| m | 8 | 9 | 8 | 9 |
| e | 0 | 3 | 24 | 27 |
| s | 1 | 3 | 73 | 81 |
| s | 1 | 3 | 220 | 243 |
| a | 6 | 9 | 1986 | 2187 |
| g | 7 | 9 | 17881 | 19683 |
| e | 0 | 3 | 53643 | 59049 |

| Value | Domain | Fraction | Symbol | Encoded domain |
|---|---|---|---|---|
| 53643 | 59049 | 8/9 | m | 9 |
| 1155 | 6561 | 0/3 | e | 3 |
| 1155 | 2187 | 1/3 | s | 3 |
| 426 | 729 | 1/3 | s | 3 |
| 183 | 243 | 6/9 | a | 9 |
| 21 | 27 | 7/9 | g | 9 |
| 0 | 3 | 0/3 | e | 3 |

Figure 37

| Symbol | Encoded |
|---|---|
| "a" | 11100 |
| "e" | 1101 |
| "g" | 11110 |
| "m" | 11111 |
| "s" | 1100 |
| "@" | 11101 |
| ".com" | 101 |
| "gmail" | 100 |
| EOD | 01 |
| Repeat last | 00 |

Figure 38

| Symbol | Encoded |
|---|---|
| "a" | 000 |
| "b" | 001 |
| "c" | 010 |
| "d" | 011 |
| "e" | 100 |
| "f" | 101 |
| N/A | 110 |
| N/A | 111 |

Figure 39

| Encoded | Symbol |
|---------|--------|
| 00 | "a" |
| 01 | "b" |
| 10 | "c" |
| 11 | "d" |
| N/A | "e" |
| N/A | "f" |

Figure 40

COMPUTER-IMPLEMENTED METHOD OF PERFORMING FORMAT-PRESERVING ENCRYPTION OF A DATA OBJECT OF VARIABLE SIZE

TECHNICAL FIELD

The present invention relates to format-preserving encryption of a data object of variable size. A data object of variable size may for example include an e-mail address, a name, an address or a text string. Format-preserving encryption mean that the algorithm is configured to encrypt a data object of a given format such that the encrypted output has a similar format.

BACKGROUND OF THE INVENTION

Format-preserving encryption is a known technology for encrypting data objects of a given format in order to achieve an encrypted form of the data object respecting the same format as the non-encrypted version.

Format-preserving encryption is generally described in "Format Preserving Encryption" by T. Spies (2008), as available on the filing data of the present patent application at https://pdfs.semanticscholar.org/23fe/f4a9beccb9ef4f064a50eee3366246474bf7.pdf and "Format-Preserving Encryption" by M. Bellare et al. (2009, as available on the filing data of the present patent application at https://eprint.iacr.org/2009/251.pdf).

Format-preserving encryption has so far typically been used to encrypt identification numbers such as credit card numbers and social security numbers. In the context of known techniques, credit card numbers and social security numbers are characterized in having a fixed size, i.e. always consisting of a predefined number of digits.

SUMMARY OF THE INVENTION

Known methods of format-preserving encryption focus on encrypting data objects of a fixed-size format, such as social security numbers or credit card numbers having a predefined number of digits. Simple methods for fixed-size format-preserving encryption may be adapted to encrypt a data object of variable size, such as an e-mail address, by defining a fixed-size format that matches the given specific object's size. For example, if the e-mail address "name@domain.com" is to be format-preserving encrypted, a fixed-size format can be defined with 4 characters before the '@', 6 characters between the '@' and the '.' and 3 characters after the '.'. Practically, the 4 and 6 and 3 characters may be concatenated and format-preserving encrypted as a 13-character text string and the '@' and '.' may then be inserted at the original positions in the encrypted string. As a consequence of this approach, the encrypted version of the e-mail "name@domain.com" will also have 4 characters before the '@', 6 characters between the '@' and the and 3 characters after the as this is how the fixed-size format defined to handle the particular e-mail address was constructed.

For a true fixed-size format, it is not a security problem to preserve the exact format of the non-encrypted data object in the encrypted data object since all encrypted data objects by definition will have that format. When all data objects have the same format, there is no information in knowing the format of a particular data object. But for a variable-size format, it may constitute a security problem to preserve the format of the non-encrypted data object in the encrypted data object since preserved format information (in the e-mail example above, that would be the total size and the positions of the '@' and '.') is non-encrypted information leaked from the non-encrypted version of the data object to the encrypted version of the data object. Due to this information leak, the encrypted data carry information which may be used to identify or exclude one or more possible input sets of data from a definite host of possible input sets of data.

On the above background, it is an objective of embodiments of the invention to provide a method which enhances security and renders format-preserving encryption of variable-size data object more secure by reducing the format information leakage.

A first aspect of the invention provides a computer-implemented method of performing format-preserving encryption of a data object of variable size, the method utilizing an inner encryption algorithm which is capable of taking a variable size input and of outputting, as its output, an encrypted version of the variable size input, the method comprising: compressing or encoding the data object in its totality to obtain a compressed or encoded version of the data object in a format compatible with the inner encryption algorithm; encrypting, by use of the inner encryption algorithm, the compressed or encoded version of the data object to obtain an encrypted version of the data object; decompressing or decoding the encrypted version of the data object to obtain a decompressed or decoded version of the encrypted version of the data object; outputting, as a format-preserved encrypted version of the data object, the decompressed or decoded version of the encrypted version of the data object.

Information leakage may hence be reduced if the data object is compressed or encoded in its totality (the compressed or encoded version of the data object including possible format properties such as position of '@' and '.') whereby this format information will also be subject to the inner encryption, instead of being passed unencrypted to the output. Compared to the previous example, this method will ensure that the '@' and '.' typically no longer have the same position in the encrypted version as in the non-encrypted version.

Further, the method of the present invention does preferably not preserve any relation between the length of the format-preserved encrypted version of the data object and the length of the original, i.e. non-encrypted, version of the data object. In other words, the steps of compressing or encoding and/or encrypting and/or decompressing or encoding may be configured such that the length of the data object is not necessarily preserved, or even such that the length of the data object is (deliberately) altered, in which case the length of the format-preserved encrypted version of the data object is (always) different from the length of the original, i.e. non-encrypted, version of the data object.

It will be understood that, whilst the method of performing format-preserving encryption of the data object, the inner encryption algorithm, which is capable of taking a variable size input, need not be format-preserving in itself. The steps of compressing or encoding, on the one hand, and/or decompressing or decoding, on the other hand, may have format-preserving properties. The step of compressing or encoding as well as the step of decompressing or decoding may thus be carried out to retain format-preserving capabilities of the method according to the invention, even though the inner encryption algorithm is not necessarily format-preserving in itself. In one example, the data object to be encrypted may be provided in a format with a plurality of degrees of freedom, such as length, position of predetermined characters, types of character sets applied, etc., whereas the inner encryption algorithm may allow fewer or only a single degree of freedom, such as number of bits (in case the inner encryption algorithm operates on bit strings), or an integer interval/domain (in case the inner encryption algorithm operates on integers within a given domain). The steps of compressing or encoding may include sub-steps of determining a format of the data object (e.g. automatically or through user input or other types of input), and the step of decompressing or decoding and/or the step of outputting may include the sub-step of rendering the format-preserved encryption version of the data object in the same format as the data object.

In the present context, "a format compatible with the inner encryption algorithm" should be understood to mean that the step of compressing produces an output which the inner encryption algorithm is capable of taking as an input, such as, for example, a simplified input in the form of, e.g., a string of bits or an integer within a given domain. Thus, if the inner encryption algorithm accepts binary input only, then the step of compressing or encoding should produce the compressed or encoded version of the data object in a binary format, even though the data object has not been in a binary format prior to the compression or encoding step.

Herein "format-preserving encryption" may be understood to mean encryption, in which an input to be encrypted as well as an encrypted output fulfils a predetermined definition of a given format. For instance, the format of the encrypted version of the data object may share predetermined attributes with the format of the original, i.e. non-encrypted version of the data object. Thus, the format of the data object may have at least one predetermined attribute which is reproduced in the format-preserved encrypted version of the data object. The at least one predetermined attribute may be one which is readable or ascertainable by a human. For example, the at least one predetermined attribute may comprise one or more predetermined characters in the data object, such as one or more of the characters '@', point ('.'), comma (','), colon (':'), semi-colon (';'), a dollar sign ('$'), '§ ', etc., and/or one or more predetermined Latin or Greek letters and/or one or more alphanumeric numbers. The at least one predetermined attribute may further comprise a position within the data object of the one or more predetermined characters in the data object.

The expression "format-preserving properties" of a method or a step should be understood to mean that at least one predetermined attribute of the data object is reproduced or retained by the method or step concerned.

Optionally, the data object may be processed by a compression algorithm to obtain a version compatible with the inner encryption algorithm and/or decompressed in order to convert the output of the inner encryption into the resulting encryption version of the data object. One advantage of using compression and/or decompression is that this method can reduce the correlation between the size of the data object and the size of the encrypted version of the data object as compression typically converts different characters into output of different size and decompression typically consumes different sizes of input in order to output different characters. Another potential advantage of using compression is that it may reduce the size of the object to be encrypted by the inner encryption which allows for other security techniques such as adding padding or integrity check information at an appropriate step of the steps of the prevent inventions.

In preferred embodiments of the present invention, the terms "encoding" and "decoding" are distinctive relative to the terms "compression" and "decompression", in that encoding and decoding algorithms use a mapping table with fixed-size encoded symbols whereas compression and decompression algorithms use a mapping table with variable-size encoded symbols.

Optionally, padding (a pre-defined or random amount of extra information, the information itself being predefined and/or random) may be added as part of the format-preserving encryption process. By, as an example, adding a random amount of padding information or by padding with an amount of information which ensures that the total size of the padded data reaches a fixed size, the correlation between the size of the data object and the size of the encryption version of the data object can be reduced or even eliminated.

Thus, format information leakage resulting from unencrypted passing of format information from input data object to the format-preserving encrypted output can be reduced or avoided. Likewise, size information leakage can be reduced or avoided since the correlation between size of input data object and the format-preserving encrypted output is reduced or eliminated.

In a second aspect the invention provides a computer-implemented method of performing format-preserving encryption of a data object of variable size, the data object having a predefined format and comprising a plurality of characters occurring in at least two sequences of text characters mutually separated by predefined format-defining characters, wherein the plurality of characters and the format-defining characters define at least one format property of the data object, the method comprising: compressing or encoding at least one of: the at least two sequences of text characters and the format-defining characters; and the at least two sequences of text characters and the at least one format property to obtain an encoded set of data; encrypting the encoded set of data by use of an inner encryption algorithm which is capable of taking a variable size input and of outputting, as its output, an encrypted version of the variable size input, to obtain an encrypted set of data; decompressing or decoding the encrypted set of data to obtain a decoded encrypted set of data fulfilling the predefined format of the data object; outputting the decoded encrypted set of data as a format-preserved encrypted version of the data object.

The sequences of text characters as well as the format-defining characters and/or the format property are thus encoded, whereby the cryptographic strength of the format-preserving encryption method of the second aspect of the invention is increased relative to other methods, in which the format-defining characters and/or the format property are omitted from encoding.

Thus, as explained above in relation to the method of the first aspect of the invention, this method may reduce leakage of format information and/or size information from the input data object to the format-preserving encrypted data object.

In a third aspect the invention provides a computer-implemented method of performing format-preserving encryption of a data object of variable size, the data object having a predefined format, the method comprising: compressing or encoding, by use of a reversible compression or encoding algorithm, the data object to obtain a compressed or encoded version of the data object; encrypting the compressed or encoded version of the data object by use of an inner encryption algorithm which is capable of taking a variable size input and of outputting, as its output, an encrypted version of the variable size input, to obtain an encrypted version of the data object; decompressing or decoding, by use of a reversible decompression or decoding algorithm, the encrypted version of the data object to obtain a decompressed or decoded encrypted version of the data object fulfilling the pre-defined format of the data object; outputting the decompressed or decoded encrypted version of the data object as a format-preserved encrypted version of the data object; wherein the decompression or decoding algorithm is different from a reversed version of the compression or encoding algorithm.

Thanks to the decompression or decoding algorithm being different from a reversed version of the compression or encoding algorithm, the algorithms may be tailored such that the compression or encoding algorithm accepts inputs where the decompression or decoding algorithm cannot generate such output, for example because the decompression or decoding algorithm does not utilize the full capabilities or accepted values of the given format and/or because the compression or encoding algorithm cannot produce certain values of the compressed or encoding version of the data object. Thus, mapping tables for compression, encoding, decompression, and/or decoding with undefined output values may be applied. This may in particular be an advantage when using encoding and decoding algorithms which encode data by mapping each symbol of the input into fixed-size encoded versions. In particular, the use of different encoding and decoding mappings may resolve constraints that would otherwise exist if a mapping table was to be applied, as such mapping table would have had to allow any value to be mapped in two directions (i.e. any possible value in a non-encoded data object would have had to be encodeable and at the same time, any possible value in an encoded data object would have had to be decodeable).

Another potential advantage of using different decompression or decoding algorithms vs. compression or encoding algorithms is that the format-preserving encryption can be constructed such that is tolerant to (minor) format errors in the input but at the same time guarantees that the format of the encrypted output is strictly valid.

As used herein, the term "format-preserving encryption" means that the output data resulting from the claimed method, i.e. ciphertext, have the same format as its input data, i.e. of the plaintext. Thus, the ciphertext (i.e. the encrypted data) has the same format as a predefined format of the plaintext (i.e. the data object). Thus, for example one or more predefined characters in the plaintext (i.e. data object) also occur in their original, non-encrypted form in the ciphertext. For example, in case the method is configured to encrypt email addresses including '@' and '.' characters, then the output will appear as an email address also including '@' and characters. Generally, format-preserving encryption ensures that its output adheres to a definition of a given format of the original data object.

The inner encryption and decryption algorithms may include any suitable method for converting plaintext into ciphertext that is not easily understood unless an appropriate cryptographic key is used for decryption. The algorithms may be of any kind known per se. For example, symmetric or asymmetric encryption algorithms may be used. Applicable algorithms include AES, RSA, and the like. Whilst these encryption algorithms are generally not format-preserving on their own, the method of the present invention is format-preserving due its format-preserving properties which, in preferred embodiments, result from the format-preserving capabilities rendered by the compressing or encoding steps, and/or by the decompressing or decoding step and/or by the outputting step.

As used herein, the term "encoding" refers to the step of converting data in one format into another format, such as by conversion of a text string into a bit string. The converted, i.e. encoded, bit string normally has a size directly proportional to the size of the input data, but it may alternatively be of a size which is not directly proportional to the input size. By directly proportional size is meant that an input of a given size, such as three characters, always results in an encoded bit string of a predetermined size, e.g., 18 bits. Encoding may be reversible by decoding to convert the encoded data back into their original form.

In the present context "compression" means conversion of data into from one format into another format, such as by conversion of a text string into a bit string. The compressed bit string normally has a size which is not directly proportional to the size of the input data. Thus, an input of a given size, such as three characters, may result in a compressed output bit string of a size which depends from the actual value (i.e. content) of the input characters. Compression may be reversible by decompression to convert the encoded data back into the original form.

In the method of the first aspect of the present invention, the decompression step preferably does not perform inverse operations relative to the compression step for the performance of format-preserving encryption. However, for decryption purposes, a decompression step is necessarily used, which is the inverse of the compression procedure applied for encryption. Likewise, for decryption, a compression step is necessarily utilized, which is the inverse of the decompression procedure used for encryption.

By analogy, in the method of the second and third aspects of the present invention, decoding is preferably not the inverse of the encoding for the performance of format-preserving encryption. However, for decryption purposes, a decoding step is necessarily used, which is the inverse of the encoding procedure applied for encryption. Likewise, for decryption, an encoding step is necessarily utilized, which is the inverse of the decoding procedure used for encryption.

In the present context, the term "bit string" refers to a sequence of bits. The term "text string" refers a sequence of characters that may include letters, digits, special characters, and/or spaces or other non-alphanumeric characters.

Herein, "integer" means whole numbers including numbers exceeding the size of the native register size capability of the computer system, in which the methods of the invention are executed. Some programming languages include software library support for dealing with integers larger than the native capability of the computer system, these are sometimes referred to as BigInteger.

E-mail address has been used as an example of a variable-size format in this text. Other examples could be a person's name, a postal address, a free-text text string, a structured text-based file, such as an XML, JSON, CSV or TXT file/document, or a part thereof, a text string describing a medical diagnosis, a product name, or a country name. Many variable-size formats use format-defining characters. As an example, the string "John Doe" contains a person's name, where the space in between "John" and "Doe" indicates where to split the text string in order to obtain the two components composing the full name: the first name "John" and the last name "Doe".

BRIEF DESCRIPTION OF THE DRAWINGS

Embodiments of the invention will now be further described with reference to the accompanying drawings, wherein:

FIGS. 1-14 are flow charts illustrating embodiments of format-preserving encryption methods according to the first, second and third aspects of the invention;

FIGS. 15-17 illustrate decoding of bit strings into valid email addresses;

FIGS. 27-40 illustrate methods for compressing, decompressing, encoding and decoding.

DETAILED DESCRIPTION OF EMBODIMENTS OF THE INVENTION

Figure 1:
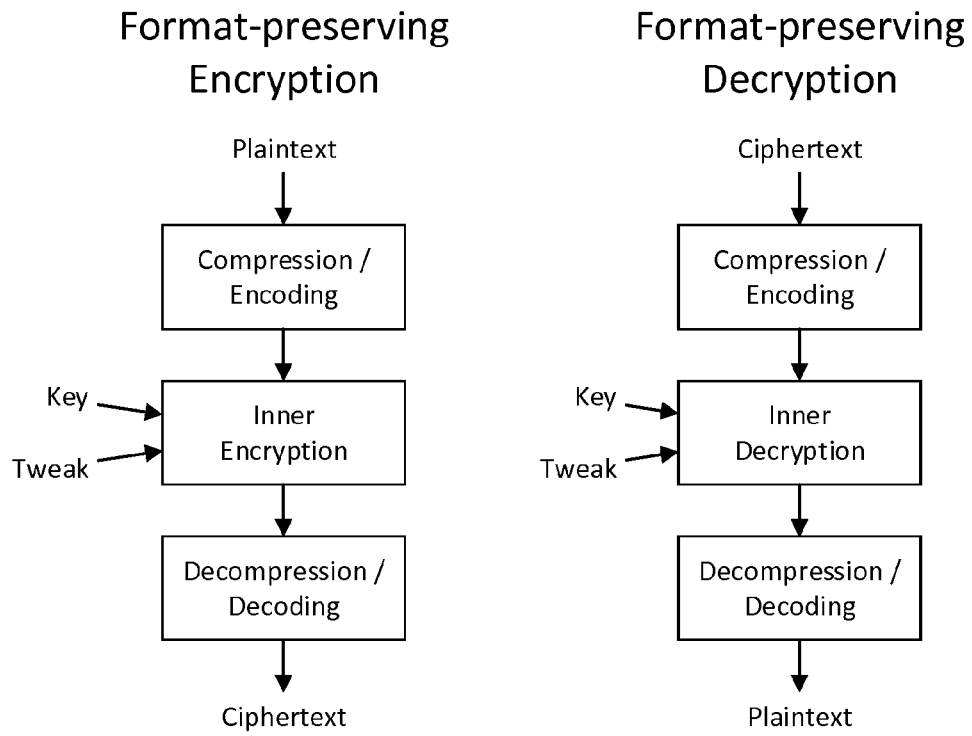

A cryptographic system for format-preserving encryption and format-preserving decryption is illustrated in FIG. 1. Format-preserving encryption is illustrated in the left side of the figure and format-preserving decryption is illustrated in the right side of the figure. Format-preserving encryption comprises the steps of compressing or encoding the plaintext (plaintext is the input to the format-preserving encryption) into a compressed or encoded version of the plaintext. The compressed or encoded plaintext is then encrypted using an inner encryption algorithm which may also take a key and/or a tweak as input to obtain an encrypted version of the plaintext. Finally, the ciphertext (the encrypted version of the plaintext) is obtained by decompressing or decoding the encrypted version of the plaintext. Format-preserving decryption is performed by first compressing or encoding the ciphertext and then decrypting the compressed or encoded version of the ciphertext using the same key and/or tweak as used during format-preserving encryption. The decrypted version of the ciphertext is then decompressed or decoded to obtain the plaintext.

Figure 2:
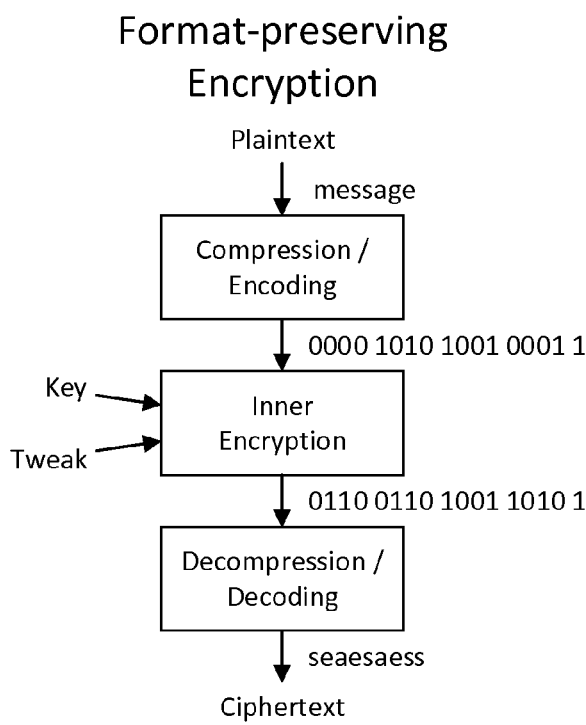

The same system is shown in FIG. 2 with an example added. The text "message" in given as input (plaintext) to the system. The compression or encoding step converts the plaintext text string "message" into the bit string 0000 1010 1001 0001 1 (spaces between the blocks of 4 bits are added for readability). The compressed or encoded version of the plaintext is then encrypted. The inner encryption algorithm is in this example also given a key and a tweak. The encrypted version of the plaintext is in this example a bit string of the same size as the compressed or encoded version of the plaintext. This encrypted version of the plaintext is decompressed or decoded in order to get a ciphertext, in this case "seaesaess", which has the same format as the plaintext; in this example, the format is defined as a text string consisting only non-capital characters in the range 'a' to 'z'. However, in this example, the ciphertext has a different size than the plaintext.

One implementation of a tweak could be to compute as hash over the key and the tweak and use the result as key for the inner encryption algorithm. Another implementation could be to compute has MAC over the tweak using the key as the MAC's key. The result or a value derived thereof can be used as key for the inner encryption algorithm. Another implementation could be to apply a block cipher where the key is used as key to the block cipher and the tweak is used as plaintext. The block ciphers result (ciphertext) or a value derived thereof could be used as key for the inner encryption algorithm.

It will thus be appreciated that, in an embodiment of the invention, the output format-preserved encrypted version of the data object (the ciphertext) may has a different size than the input data object (the plaintext). For some formats, it is an advantage that the ciphertext has a different size than the plaintext as this reduces the information leakage as explicated in the above summary of the invention.

The system illustrated in FIG. 1 can be adapted to operate on plaintext of a given format and to generate ciphertext of the same format. The decompression or decoding step in format-preserving encryption can for example be constructed such that it ensures that format requirements are met in the generated ciphertext. For example, when the format to format-preserving encrypt is a text string with e-mail address format, the format-preserving encryption may be configured to handle a text string that has a '@' and that it has at least one after the '@'. A trivial method to ensure this is simply to decompress or decode the encrypted version of the plaintext into a set of characters valid in an e-mail address with the exception of '@' and add then insert '@' and '.' at random legal positions of the decompressed or decoded set of characters. Another method is to decompress or decode a part of the encrypted version of the plaintext into a set of characters valid in an e-mail address with the exception of '@' and '.' and decompress or decode the remaining part of the encrypted version of the plaintext into positions of where to insert '@' and '.' in the decompressed or decoded set of characters.

Generally, FIGS. 1 and 2 illustrate embodiments of the first, second and third aspects of the invention.

Given that the data object (plaintext) is compressed in its totality, information leakage may be reduced as explicated in the above summary of the invention.

Figure 3:
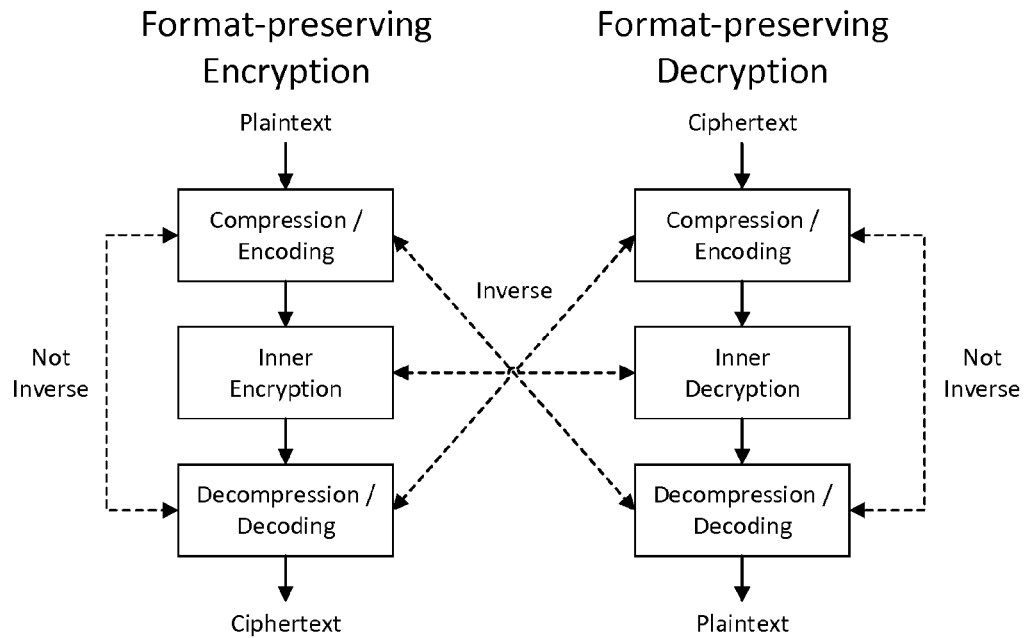
Figure 4:
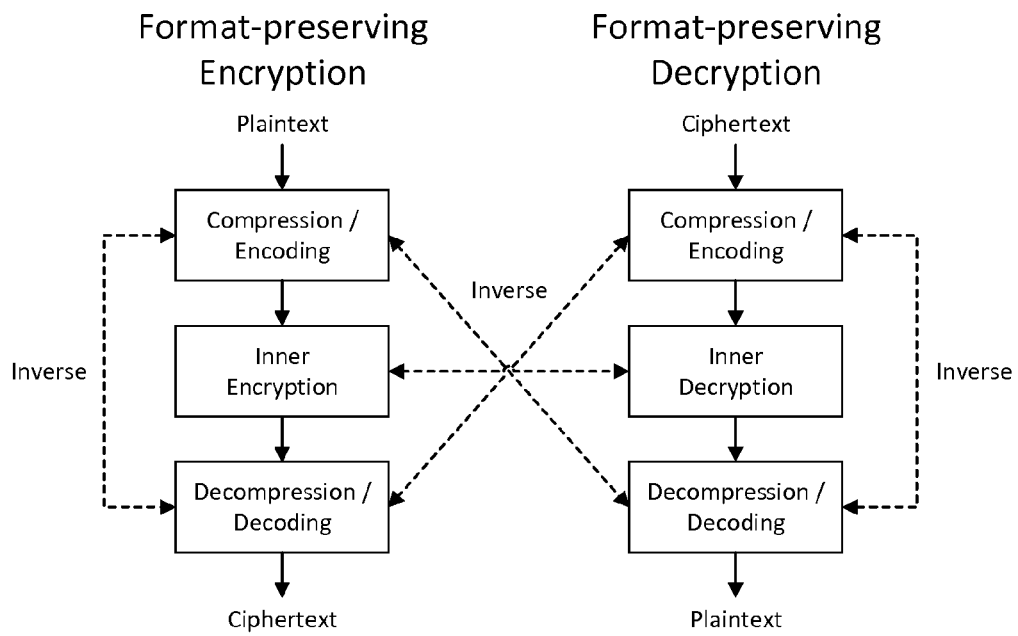

FIGS. 3 and 4 illustrates that different algorithms or different configurations of algorithms can be used as long as the decompression or decoding step used for format-preserving decryption (lower right on the figure) is the inverse of the compression or encoding step used for format-preserving encryption (upper left on the figure) and the inner decryption step in format-preserving decryption is the inverse of the inner encryption step in format-preserving encryption and the compression or encoding step used for format-preserving decryption is the inverse of the decompression or decoding step used for format-preserving encryption.

FIG. 3 illustrates that the decompression or decoding in format-preserving may not be the inverse of the compression or encoding in format-preserving encryption. Likewise, the decompression or decoding in format-preserving decryption may not be the inverse of the of the compression or encoding in format-preserving decryption.

FIG. 4 illustrates that the decompression or decoding in format-preserving may be the inverse of the compression or encoding in format-preserving encryption. Likewise, the decompression or decoding in format-preserving decryption may be the inverse of the of the compression or encoding in format-preserving decryption.

It will thus be appreciated that, in an embodiment of the invention, the steps of compressing or encoding and decompressing or decoding utilize different schemes, such as a: different configurations of a compression and decompression algorithm, b: different configuration of an encoding and decoding algorithm, c: compression used at one step and decoding used at another step, or d: encoding used at one step and decompression used at another step. Generally, utilization of a different scheme for compression or encoding and decompression or decoding has the advantage that it simplifies the design of a format-preserving encryption for variable size data objects. Constructing a compression or an encoding algorithm that can take any valid formatted data object and convert it into a form compatible with encryption and where its inverse can convert any form of the encrypted version of any plaintext into a validly formatted plaintext may often be more cumbersome than constructing two algorithms for compression/encoding and decompression/decoding, respectively.

Figure 5:
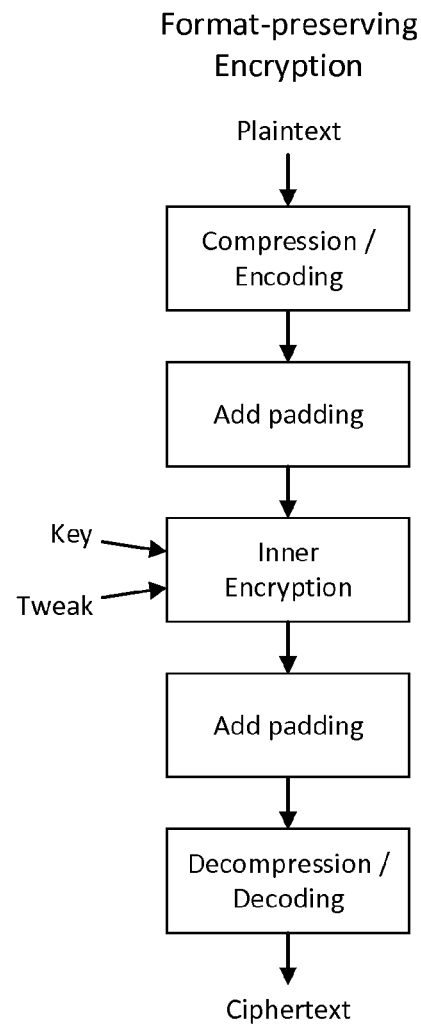

FIG. 5 illustrates how padding can be added before the inner encryption step and/or after the inner encryption step. Padding before inner encryption may be performed to satisfy constraints imposed by the encryption algorithm (for example if the encryption algorithm only supports certain sizes of input or impose other constraints on the input). Padding may be performed to satisfy constraints imposed by the decompression or decoding algorithm (for example a minimum size). Padding may be performed to reduce correlation between size of plaintext and size of ciphertext. Padding may expand the compressed plaintext to a fixed size in order to remove correlation between size of plaintext and size of ciphertext.

It will thus be appreciated that, in an embodiment of the invention, at least one of the compressed or encoded version of the data object and the encrypted version of the data object comprises a bit string, the method further comprising padding at least one of the compressed or encoded version of the data object and the encrypted version of the data object by adding one or more bits of padding information to the at least one of the compressed or encoded version of the data object and the encrypted version of the data object prior to either one of the steps of encrypting and decompressing. Generally, utilization of padding may increase the security by reducing correlation between ciphertext and plaintext or may make the compressed or encoded version of the data object or the encrypted version of the data object compatible with encryption or decompression or decoding algorithms.

Padding may contain random data. Padding may contain predefined data. Padding may contain data derived from plaintext, key or tweak.

By padding with non-predictable data, for example random data, the overall encryption algorithm can become non-deterministic, i.e. if the same message is encrypted two times with the same key (and same tweak, if used), the output will be different (or different with a given probability, dependent on likelihood of collisions in the padding data). But still, the decryption algorithm can bring back the original plaintext. An advantage of non-deterministic encryption is that someone with access to encrypted records cannot determine if the corresponding non-encrypted records contain values that are repeated.

It will thus be appreciated that, in an embodiment of the invention, the step of encrypting and/or any preceding step is carried out to render the encrypted version of the data object non-deterministic.

By padding with predicable data or data that can repeatedly be recreated, the overall encryption algorithm can become deterministic, i.e. if the same message is encrypted two times with the same key (and same tweak, if used), the output will be the same. An advantage of deterministic encryption is that relations between data objects and data records are preserved. This can for example be an advantage if encrypted data is used as test data.

Padding algorithms are typically constructed in a way such that they can be reversed, e.g. the padding can be removed before or during the inner decryption. Padding may use a known algorithm for padding, such as ANSI X.923, ISO 10126, PKCS7, or ISO/IEC 7816-4. Padding may comprise adding one bit with the value 1 and any number of bits with the value 0 (or 1 and 0 may be swapped).

Padding may respect the format of the compressed plaintext and/or format of encryption algorithm, including binary, integer, or integer with a domain.

When decrypting a ciphertext, the padding may have to be removed before and/or after the decryption step. Most padding schemes are constructed such that the padding can be removed by means of an appropriate algorithm. In some designs of the system, padding may not need to be removed after the decryption step, for example if the compression used during encryption have embedded size information or end-of-data marker(s) in the compressed data, since the decompression during decryption then can know when it does not need to process more decrypted decompressed ciphertext.

Figure 6:
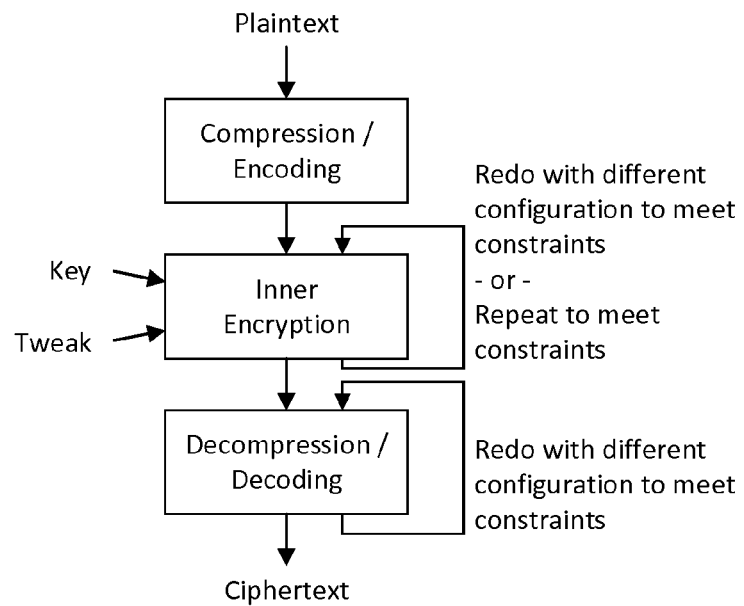

FIG. 6 illustrates a method for ensuring that the generated ciphertext meet eventual format property constraints. If the encryption of a plaintext leads to a ciphertext not meeting a format property constraint (for example exceeds size maximum, does not contain required characters, contain illegal characters, or an e-mail address does not have a valid format, e.g. does not contain one '@' and one or more subsequent '.'), the decompression or decoding can be performed again on the encrypted compressed plaintext, but with a different decompression algorithm or decoding algorithm or with a different decompression algorithm configuration (for example a different symbol mapping) or decoding algorithm configuration. This may, if needed, be repeated based on a set of available decompression algorithms or a set of available decompression algorithm configurations. In order to ensure that the appropriate decompression algorithm or decompression algorithm configuration is used for decompression in the decryption flow as part of format-preserving decryption, it may be needed to embed information in the generated ciphertext. An example could be that if the first letter of the ciphertext is a capital letter, then decompression method 1 is used; else decompression method 2 is used.

Another method is to repeat the encryption step where the output of the previous encryption step is used as input to the next encryption step until decompression of the output of the compression step leads to a ciphertext which meets the constraints.

It will thus be appreciated that, in an embodiment of the invention, the steps of a: compressing or encoding, b: encrypting and c: decompressing or decoding are performed by use of a first set of configuration data by use of a first set of algorithms in steps a, b and c, the method further comprising the steps of: determining a format property, such as a size, of the format-preserved encrypted version of the data object; determining if the format property of the format-preserved encrypted version of the data object complies with a predetermined constraint; and if the characteristic fails to comply with the predetermined constraint: redoing at least one of steps a, b and c by use of second configuration data different from the first configuration data and/or use of second type of algorithm in at least one of steps a, b and c different from the first algorithms to obtain a new format-preserved encrypted version of the data object. Generally, utilization of redoing a step with a different configuration may allow the format-preserving encryption to respect certain constraints on format properties on the ciphertext. The step may be carried out repetitively until the predefined constraint is met.

It will thus be appreciated that, in an embodiment of the invention, the steps of a: compressing or encoding, b: encrypting and c: decompressing or decoding are performed by use of a first set of configuration data by use of a first set of algorithms in steps a, b and c, the method further comprising the steps of: determining a format property, such as a size, of the format-preserved encrypted version of the data object; determining if the format property of the format-preserved encrypted version of the data object complies with a predetermined constraint; and if the characteristic fails to comply with the predetermined constraint: applying the encryption algorithm to the encrypted version of the data object to obtain a further encrypted version of the data object, and decompressing the further encrypted compressed version of the data object to obtain a new format-preserved encrypted version of the data object. Generally, utilization of applying the inner encryption algorithm on the encryption version of the data object may allow the format-preserving encryption to respect certain constraints on format properties on the ciphertext. The inner encryption algorithm may be utilized repetitively until the predefined constraint is met.

Another method is to repeat the entire format-preserving encryption on the ciphertext of the previous application of the format-preserving encryption until the format property constraints are met.

Figure 7:
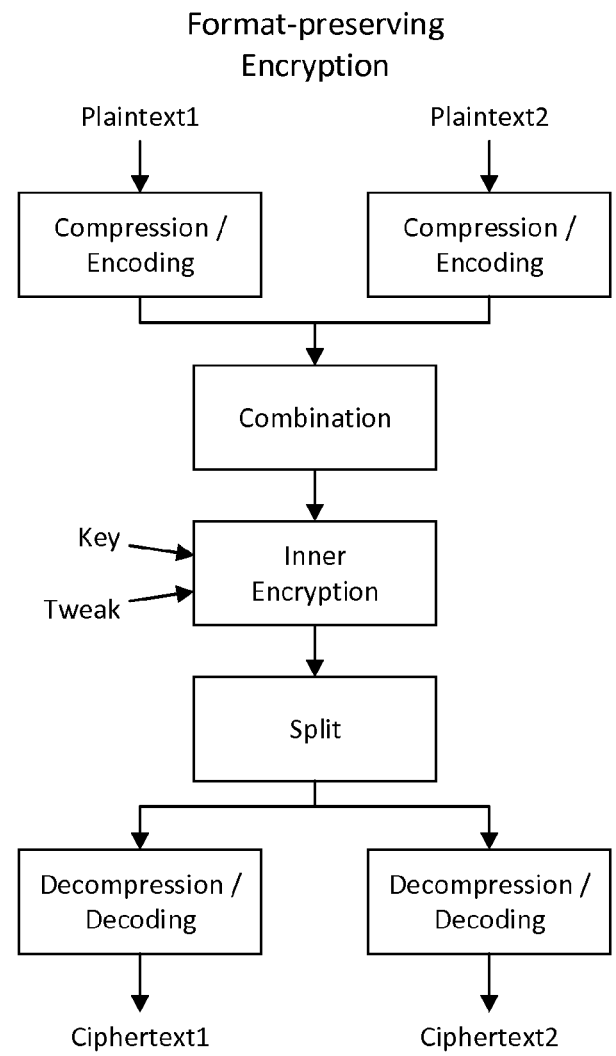
Figure 8:
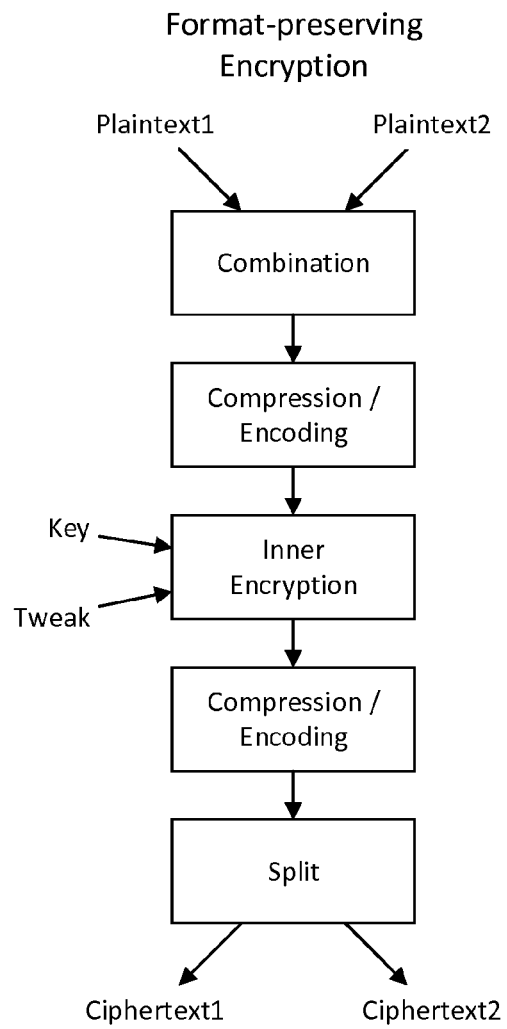

FIG. 7 illustrates how a number (two or more) of plaintext objects can be format-preserved encrypted together. The plaintext objects are first compressed or encoded individually. Then, the results of the compression or encoding are combined using a suitable method. The combined data in processed by the inner encryption and thereafter split again. The split objects are decompressed or decoded to arrive at the ciphertext objects. FIG. 8 illustrates another method for format-preserved encryption of a number of plaintext objects together. In this method, the combination is performed before the compression or encoding. In one embodiment, the number of ciphertext objects is equal to the number of plaintext objects. In one embodiment, each ciphertext object has the same format as a corresponding plaintext object. In one embodiment, the type of at least one of the ciphertext objects and corresponding plaintext objects have a fixed-size format and the split step has been designed such that it ensures that the fixed-size ciphertext objects will have the appropriate size. In one embodiment, padding data is added before or after inner encryption.

Figure 9:
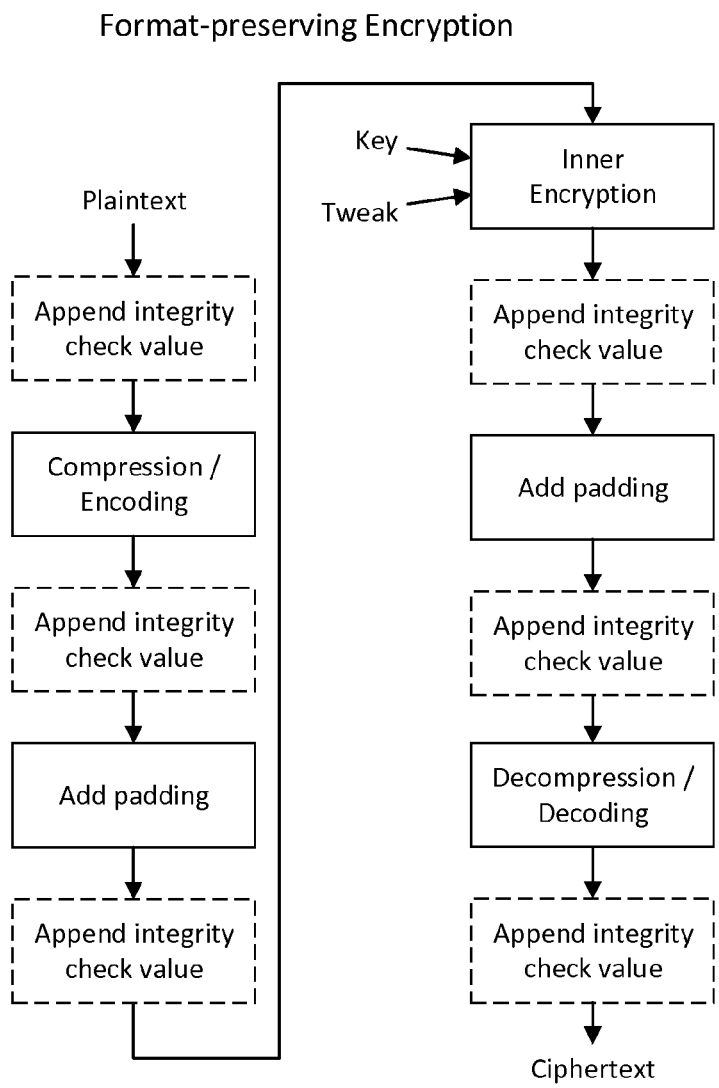

An integrity check value (also known as authentication data) may be embedded into the ciphertext by the format-preserving encryption to allow verification of the integrity of the ciphertext as part of the format-preserving decryption or independent of the format-preserving decryption. FIG. 9 illustrates how the integrity check value can be appended or integrated at any step. The integrity check value may be computed as a MAC (message authentication code) fully or partly computed on plaintext or data derived from the plaintext. The key to the MAC may be the same key as used for encryption or derived from the encryption key or from a key where the encryption key is also derived. The integrity check value may be derived from a hash function fully or partly computed on plaintext or data derived from the plaintext.

Figure 10:
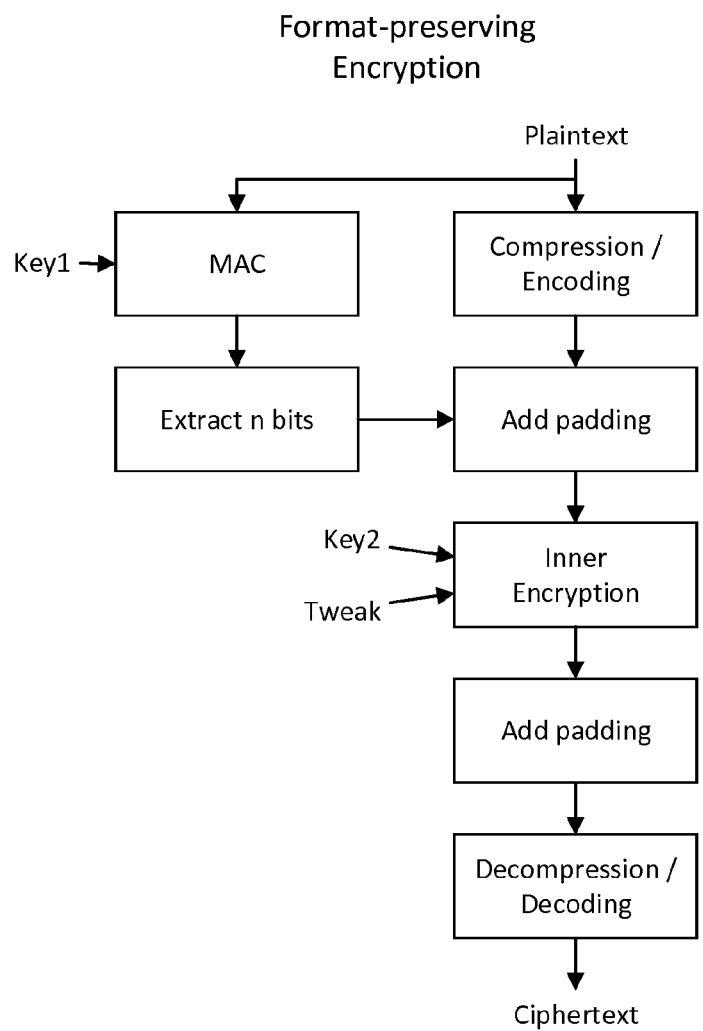

FIG. 10 illustrates encryption with embedded integrity check information. In the left side of the figure, the plaintext is processed by a MAC function given a key. The output from the MAC function is then further processed to extract n bits of information. In the right side of the figure, the plaintext is compressed or encoded and padding is added to the compressed or encoded plaintext. This padding includes the n bits extracted from the result of the MAC function. This padded compressed plaintext is encrypted, further padded and decompressed or decoded in order to arrive at the ciphertext. The key used for MAC computation may be the same or different from the key used for inner encryption. The key used for MAC computation may be derived (fully or in part) from another key; the key used for inner encryption may be derived (fully or in part) from the same other key.

It will thus be appreciated that, in an embodiment of the invention, adding authentication data to at least one of the data object, the compressed or encoded version of the data object, the encrypted version of the data object, and the format-preserved encrypted version of the data object; and authenticating at least one of the data object, the compressed version of the data object, the encrypted version of the data object, and the format-preserved encrypted version of the data object by verifying the authentication data added during the further operations. Generally, utilization of embedded authentication data enhances security be allowing the receiver of an encrypted data object to verify if the data object is authentic or if it has been tampered.

Figure 11:
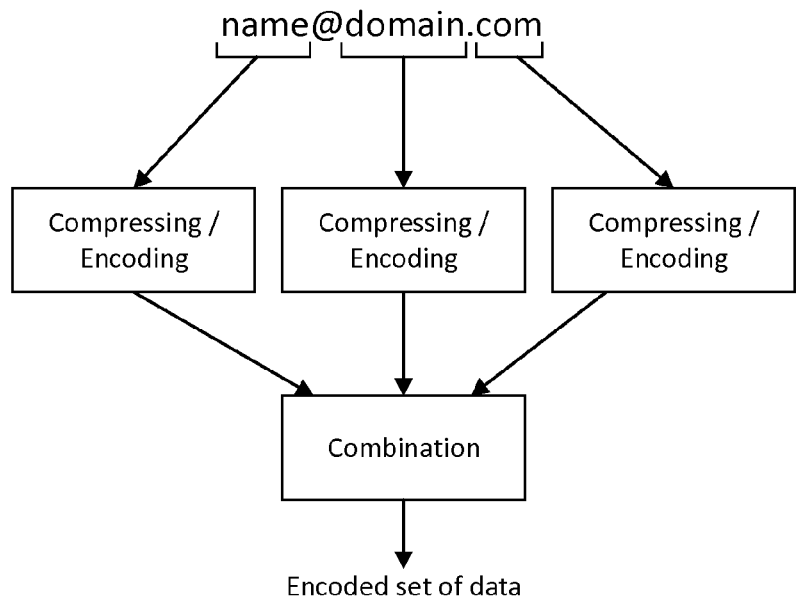

FIG. 11 illustrates a method for compressing or encoding a text string formatted as an e-mail address where the text string is first split at the '@' and thereafter split at the subsequent '.' (one or more). In this example, the splits lead to three text strings, which are compressed or encoded individually. The compressed or encoded text strings are then combined to get an encoded set of data which can be encrypted using an inner encryption algorithm. The entire process of compressing or encoding and combining should be executable in a reversible manner. The reversibility can for example be ensured by encoding EOD markers during the compression or encoding steps (may be omitted from one), such that, during decompression or decoding, it can be determined when one substring ends and the next begins. Another method could be to include compressed or encoded size information. In this example, it is straight forward to assemble the substrings into the plaintext in when the encoding is reversed, simply by taking the first substring, a '@' and the second substring and combine them. To that intermediate string, '.' and the next substring is appended (repeatedly if the plaintext has several '.' after the '@').

Figure 12:
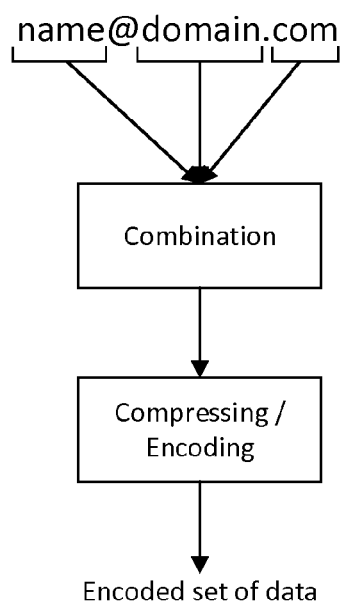

FIG. 12 illustrates a method for compressing or encoding a text string formatted as an e-mail address where the text string is first split at the '@' and thereafter split at the subsequent (one or more). In this example, the splits lead to three text strings, which are combined before being compressed or encoded in order to get the encoded set of data.

Figure 13:
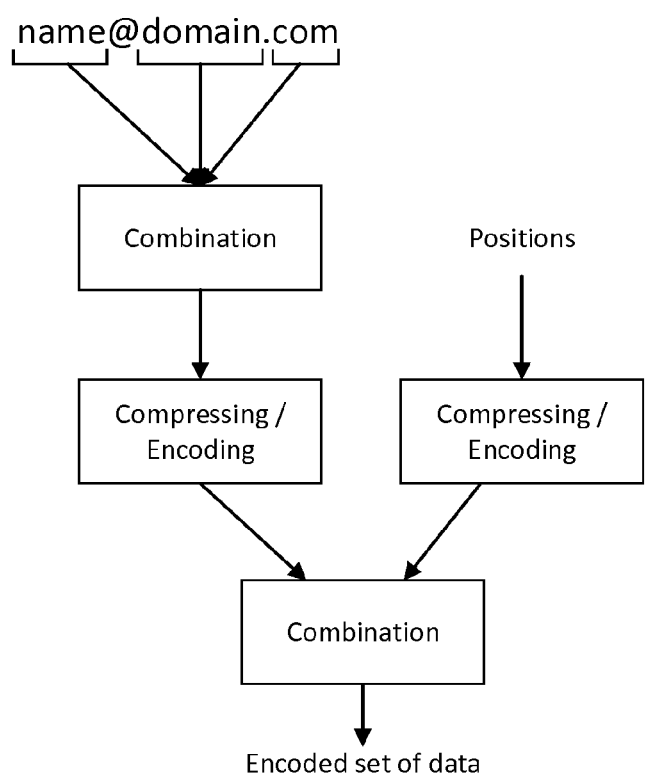

FIG. 13 illustrates how format properties, such as the positions of '@' and '.' can be compressed and encoded and then combined with the compressed or encoded version of the substrings in order to achieve the encoded set of data.

It will thus be appreciated that, in an embodiment of the invention, the data object comprises a plurality of characters, and wherein the step of compressing or encoding utilizes a scheme which maps one or more of the characters into a mapped partial output, and wherein the scheme is configured to identify at least one predetermined format property of the data object, and wherein the scheme is further configured to map the one or more characters and the format property, so as to render the compressed or encoded version of the data object dependent from the one or more characters and the at least one format property. Generally, compressing or encoding format properties allows for compressing or encoding data objects of complex structures.

FIG. 14 illustrates format-preserving encryption of a data object of a predefined format, in this example the e-mail address "name@domain.com". The format of an e-mail address is characterized by being a text string containing: 1. One or more characters, numbers, or certain symbols. 2. One '@', 3. One or more (typically two or more) text strings of characters separated by The entire e-mail address is encoded character-by-character into a bit string using a reversible encoding which can accept any character which is legal in the format of an e-mail address, including '@' and '.'. The encoded e-mail address bit-string is appended by a number of padding bits. The padded encoded e-mail address is encrypted using an inner encryption algorithm given a key and optionally a tweak. The encrypted padded encoded e-mail address is decoded into a text string having a valid e-mail address format using an appropriate decoding algorithm. This decoding algorithm is constructed such that it ensures that the e-mail address contains exactly one '@' and at least one '.' after the '@' where each '@' and '.' have at least one character on both sides. Decryption of the encrypted e-mail address can be performed by first decoding the encrypted e-mail address into a bit string. This bit string is decrypted and the padding is removed. This bit string is then encoded in order to arrive at the plaintext e-mail address.

FIG. 15 illustrates an example of a first step of a decoding algorithm for decoding a bit string into a test string having a valid e-mail address format. The first two bits of the bit string used to select a pattern for where to insert '@' and '.'. using a pattern selector table as illustrated in FIG. 16. The remaining bits of the bit string are decoded into a text string containing characters which are valid at any position at an e-mail address. Finally, '@' and '.' are inserted into the decoded text string according to the pattern as illustrated in FIG. 17 in order to form a text string having a valid e-mail address format. To encode this text string back into a bit string, the positions of the '@' and '.' symbols in the text string are determined and using the table in FIG. 16, the first two bits of the bit string are recovered. The text string excluding the '@' and '.' are then encoded and the result of this decoding is appended to the first two bits already encoded in order to obtain the resulting encoded bit string.

An alternative decoding algorithm could simply decode the entire bit string into a test string and then insert a '@' and '.' thereafter a into the test string at any random or predefine positions in order to give it a valid e-mail address format. To encode this string back into a bit string, the '@' and '.' are first discarded. Thereafter, the remaining text string is encoded into a bit string.

The encoding used in the encryption process may not be able to generate all possible bit strings. And likewise, the decoding used in the decryption process may not be able to decode all possible bit strings. But the decoding used in the decryption process should be able to decode any bit string generated by the encoding in the encryption process. And the encoding used in the encryption process should be able to encode any plaintext adhering to the specified format of the plaintext. The decoding in the encryption process may not be able to generate all possible ciphertexts. And likewise, the encoding used in the decryption process may not be able to decode all possible ciphertexts. But the encoding used in the decryption process should be able to encode any ciphertext generated by the decoding in the encryption process.

Figure 18:
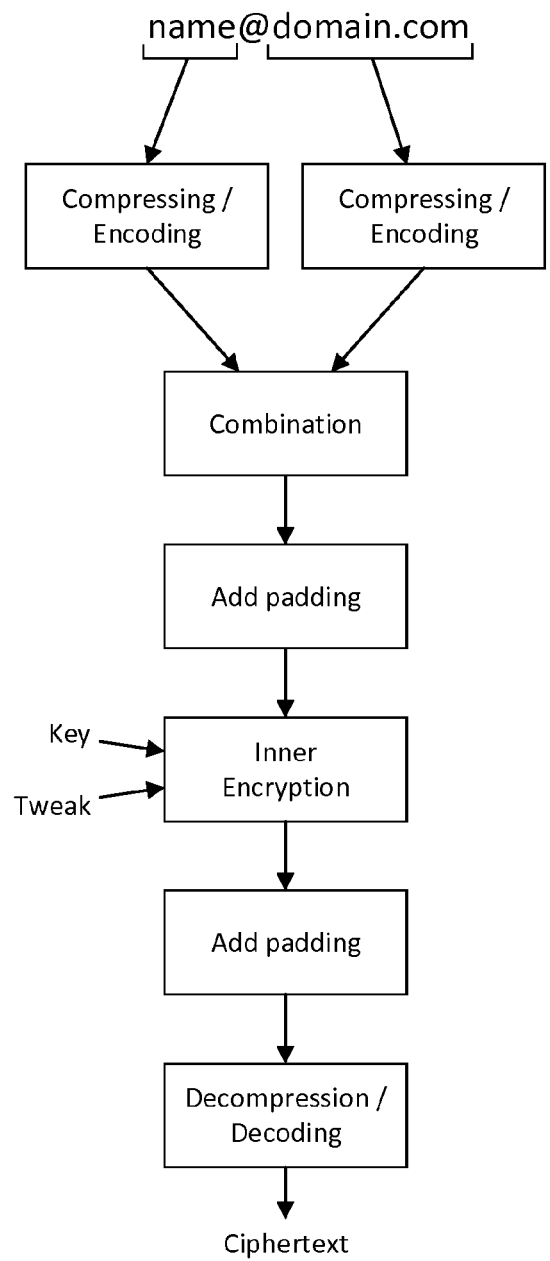
FIG. 18 illustrates how a data object may be split into components before being compressed or encoded as part of the format-preserving encryption process.

FIG. 18 illustrates an example of format-preserving encryption of an e-mail address. First, plaintext string is split at the '@'. The substrings before and after '@' are compressed or encoding using different mapping tables since the definitions of legal characters are different before and after '@'. The part after '@' may even be converted to lower-case-only before compression or encoding since that part is not case-sensitive in an e-mail address. The compression or encoding algorithm processing the part after '@' may be able to recognize common substrings, such as "gmail", "yahoo", "hotmail", and ".com", and map these into one compressed or encoded symbol. The encoded versions of at least one of the strings may include size information or EOD marker to guide a decompression or decoding step performed during format-preserving decryption where to split the two substrings. The two substrings are then combined and padding may be added. The result is then encrypted using the inner encryption algorithm. The output of encryption may be further padded to ensure compatibility with decompression or decoding. Finally, a decompression or decoding method is applied, this method is constructed such that it is guaranteed that the output ciphertext has a legal e-mail format.

Figure 19:
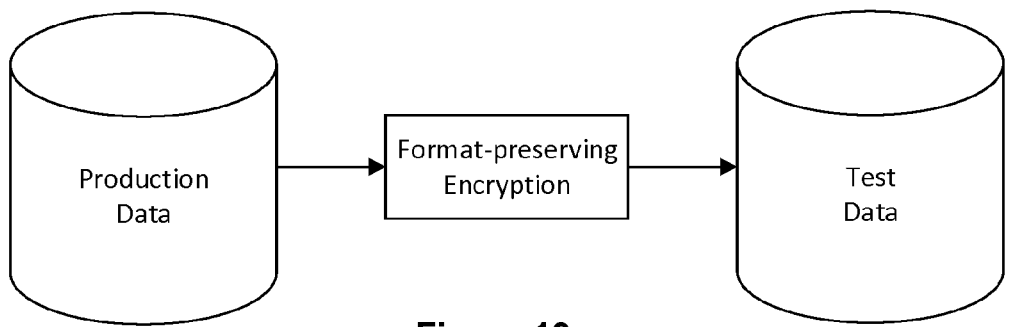
FIG. 19 illustrates how the present invention may be used to produce test data from production data.

FIG. 19 illustrates how format-preserving encryption may be used to convert data from a production IT system (potentially being personally identifiable information and/or confidential information) into test data to be used in a non-production IT system. The format-preserving encryption can ensure that privacy and confidentiality will not be compromised by this operation.

Figure 20:
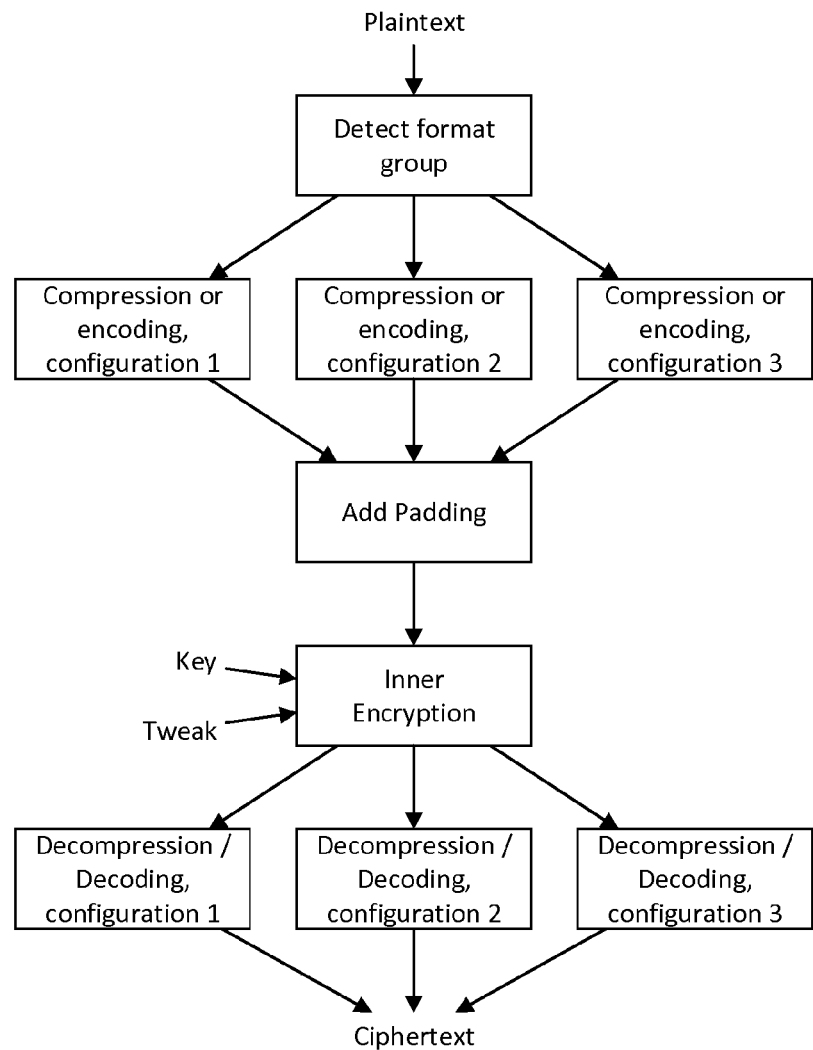
FIG. 20 illustrates how the format of a data object may be detected and compressed or encoded according to the detected format as part of the format-preserving encryption process.

FIG. 20 illustrates an example of format-preserving encryption where the plaintext where the plaintext can belong to one of a predefined set of format groups. Format groups can for example be different formats of a person's name; one group being names containing Latin letters, a second group containing Arabic letters and third group containing Chinese letters. Another example of format groups is that the explicit format of a data record it not known; it may have one of several formats, the plaintext can for example hold either an e-mail address, a person's name, or an address. In the example, the first step is to detect which format group matches the plaintext. Thereafter, the plaintext is processed by the appropriate configured compression or encoding algorithm, padding is added, and the result is processed by the inner encryption algorithm. The encrypted version of the plaintext is then decompressed or decoded, often with a configuration equivalent to the one used for compression or encoding such that the ciphertext belong to the same format group as the plaintext. There may be applications, however, where it is not desirable that the ciphertext belong to the same format group as the plaintext; in that case the encrypted version of the plaintext may always be decompressed or decoded into the same format group or the format group may be chosen at random or derived from the encrypted version of the plaintext, e.g. by decompressing or decoding a part of the encrypted version of the plaintext.

Figure 21:
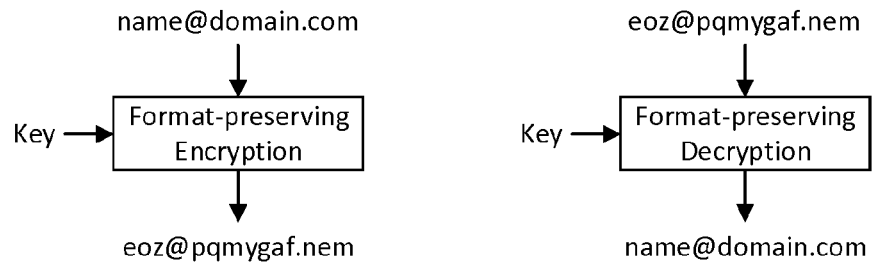
FIGS. 21-24 illustrate how different keys and/or tweaks may be used for format-preserving encryption.

Format-preserving encryption and format-preserving decryption of an e-mail address is illustrated in FIG. 21. The e-mail address represented by the text string "name@domain.com" is processed by the encryption algorithm using a key into the encrypted test string "eoz@pgmygaf.nem". The encrypted text string is a valid formatted e-mail address but the original e-mail address cannot be derived from the encrypted string without knowing the key used in the encryption step.

Figure 22:
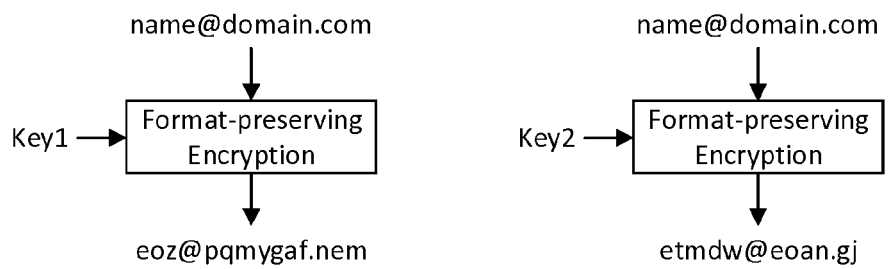

Format-preserving encryption under two different keys is illustrated in FIG. 22. Even though the same e-mail address is given as input to the same encryption function, the encrypted text strings are different since the two encryption operations used different keys.

Figure 23:
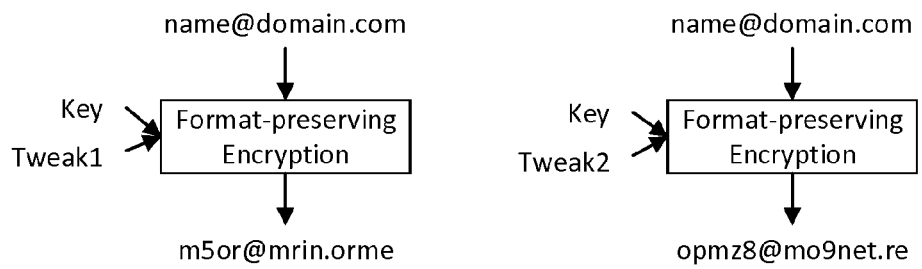
Figure 24:
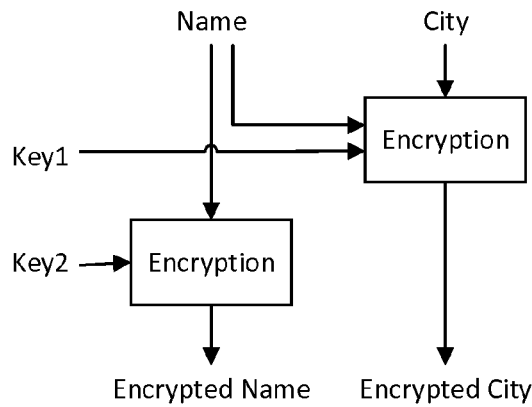

Format-preserving encryption may also depend on a tweak. The tweak is given as input to the encryption algorithm together with the key. As illustrated in FIG. 23, if the same input is provided, in this example "name@domain.com", this results in different outputs if the tweaks are different even if the keys are the same. In contrast to a key, a tweak may in many applications be known to an adversary without compromising the system's security. "Tweak" is similar or related to the terms "initialization vector", "IV", salt or "nonce" in many texts. An example of an encryption setup using tweak is illustrated in FIG. 24, where two data objects named "Name" and "City" are to be encrypted. The data object named "Name" is encrypted under the key named "Key2" into "Encrypted Name". The data object named "City" is encrypted under "Key1" and using "Name" as tweak into "Encrypted City". As a consequence, if two data records have the data objects "Name" and "City" where "Name" are different, "Encrypted City" will be different for the two encrypted data records even if the values of "City" in the non-encrypted data records are the same. An alternative setup could be that "Encrypted Name" is used as tweak instead of "Name". A record ID, such as a database primary key, may also be used as a tweak. A date and/or time may also be used as a tweak.

Figure 25:
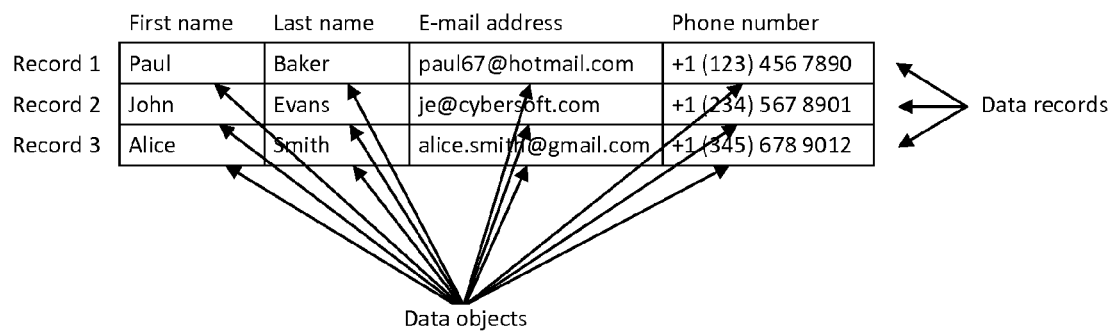
FIG. 25 illustrates three data records consisting of each four data objects.

FIG. 25 illustrates 3 data records with each 4 data objects resulting in a total of 12 data objects. In the example, the 4 data objects per data records are named "First name", "Last name", "E-mail address" and "Phone number". The data records may for example be rows in a database table or view, objects in a structured or semi-structured file format or data records stored in memory. The data records may for example be represented in the C++ programming language as a struct or as a class or in the Java programming language as a class.

Records may be nested, i.e. one field in one record may contain a data object which in itself is a data record containing data objects, etc.

It will thus be appreciated that, in an embodiment of the invention, the data object has been derived from a data record comprising the data object and at least one associated data object, and wherein at least one of the steps of a: compressing or encoding, b: encrypting, c: padding and d: decompressing or decoding depends on at least a portion of the associated data object or data derived from at least a portion of the associated data object. Generally, utilization of a tweak enhances cryptographic strength since it can ensure that if two data objects related to two different data records have the same values, the encrypted versions of the two data objects have different values. Thus, an adversary having access to the encrypted data cannot determine that the plaintext versions of the two data objects had the same value.

Some textual or numerical data formats have a fixed size. Example of fixed-size data formats are credit card numbers, social security numbers, bank account numbers, phone numbers, and postal codes. Note, however, that all these examples only have a fixed size within certain restrictions, typically geographical restrictions. For example, a US postal code may consist of five digits or alternatively five digits followed by a '-' and four digits whereas a UK postal code consists of two to four alphanumeric characters, a space and three alphanumeric characters. The fixed-size data formats mentioned, with the exception of credit card numbers, typically have different sizes in different countries. For credit card numbers, the size is often 16 digits, but some issuers use fewer and some use more digits. In reality, credit card numbers can be between 12 and 19 digits long. Thus, an information processing or storage system utilized in embodiments of the present invention may in reality treat data of these formats as variable-size in order to be able to handle any possible format.

Some textual or numerical data formats have a variable size. Examples are names, addresses, e-mail addresses, web site URLs, labels, monetary amounts, IP numbers, XML, data, JSON data, and free texts. Some of these formats put requirements on the text characters, digits and/or special characters digits contained in the data object. For example, an e-mail address must contain a '@' as well as at least one after the '@'. Another example is that most information processing or storage systems impose limits on the size of the data objects.

Data objects may also be of binary nature like for example a file containing a file or a compressed archive or encrypted information. Binary data objects may be stored directly in files or as binary objects in databases or within data records or converted to text form (for example via hexadecimal encoding or base64 encoding). Binary data converted or encoded to text may be used in similar as other textual data.

In some information processing or storage applications, some or all data objects may be empty or may hold the value null to indicate that the data object is not populated.

In one embodiment of the present invention, a structured or semi-structured file or data object, such as XML, or JSON, is encrypted using format-preserving encryption. The method may for example be constructed such that element content and attribute values are encrypted but overall file structure, element tags and attribute keys/names are not altered. In one embodiment, only element content of certain element types/elements with certain names or only attribute values of certain types of attributes/attributes with certain keys/names are encrypted.

Figure 26:
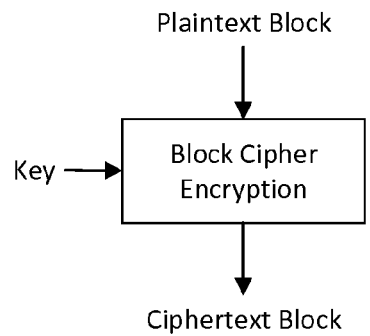
FIG. 26 illustrates a block cipher.

A conventional block cipher as illustrated in FIG. 26 takes a block of a fixed size, usually 128 bits, as input and encrypts it into a block of the same size. The un-encrypted input is typically called plaintext and the encrypted output is usually called ciphertext. The block cipher also takes a key as input, typically with a size of between 128 bits and 256 bits. The block cipher can decrypt the ciphertext into the original plaintext provided that the same key is given to the decryption algorithm as was given to the encryption algorithm.

Some block ciphers have a configurable block size such that the user of the algorithm can choose the size of the plaintext and ciphertext. There may be some constraints to the block size, for example a minimum size, a maximum size and/or that the size has to be a multiple of for example 2.

Some block ciphers have plaintext and ciphertext which are integers within a certain domain. For example, if the domain is defined as 0 to 999, any integer number between 0 and 999 (both included) can be given as plaintext and the encryption algorithm will then give a ciphertext also in the domain from 0 to 999. The domain may be configurable. There may be some constraints to the domain, for example a minimum number of numbers in the domain, a maximum number of numbers in the domain, that the number of numbers in the domain must be a multiple of for example 2, that the number of numbers must be a power of 2, and/or that it can be factorized into two factors of similar size. Block ciphers operating on a domain may be suitable to operate on output of the compression algorithm illustrated in FIGS. 34 to 37.

In one embodiment of the present invention, the inner encryption algorithm comprises a block cipher.

In one embodiment of the present invention, the inner encryption algorithm is a public key encryption algorithm, such as RSA.

Data compression is the art of representing a data object in a compact way. Data compression can be either lossless or lossy. In lossless compression, the exact original data object can be restored upon decompression whereas in lossy compression, only an approximate data object can be restored upon decompression. Lossy compression is often used for compression audio/video content as the lost details often can be accepted and since the greater compression ratio typically offered by lossy compression is typically required in order to compress the audio/video data down to an acceptable size.

One method for lossless data compression is Huffman coding. In Huffman coding, a mapping table is constructed between input symbols and their encoded representation where the encoded representations typically have different size. The mapping table is typically arranged such that frequent symbols are encoded into shorter representations whereas less frequent symbols are encoded into longer representations.

For use in the present invention, Huffman mapping tables or other compression/encoding procedures may be constructed with priorities other than to minimize the size of their output. For example, compression/encoding procedures may be tailored to output data having unpredictable size. The mapping tables may, for example, be generated on the basis of a cryptographic procedure such that the mapping table depends on a key. This dependency may for example be achieved by feeding the key as seed to a pseudo-random number generator and then use data generated by the pseudo-random number generator to define the mapping table or part thereof. A construction where the mapping table depends on a key may have the advantage that the mapping table is unknown to an adversary which may contribute to further security of the solution.

Different parts of a data object may be compressed using different mapping tables. For example, when compressing an e-mail address, the part before '@' may be compressed using a mapping table which preserves is letters are capital letters or non-capital letters whereas the part after '@' may be compressed using a mapping table which is not case-sensitive, since domain names are not case-sensitive. The switch between the mapping tables can happen seamlessly simply by monitoring if a '@' has been encountered while processing the data object.

The symbols in the mapping table may for example consist of individual characters, sequences of characters, an end-of-data marker (sometimes referred to as EOD), properties (e.g. a character string's size) or a combination of any of these. In case several data objects or several distinct parts of a data objects are coded together, it may be beneficial to either encode information about the objects' or parts' sizes or to insert an end-of-data marker at the end of each object or part to indicate where an object or part ends and the next starts.

Figures 27, 28, 29, 30:
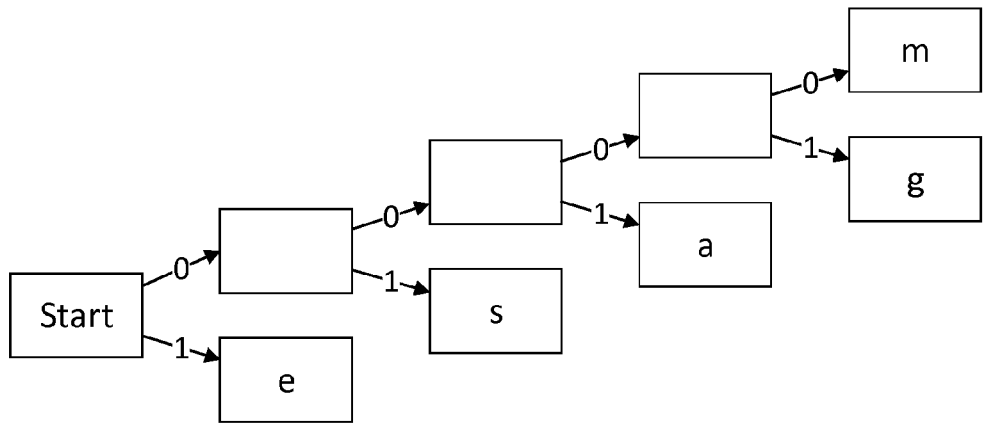

As an example, we will encode the text string "message" using the mapping table in FIG. 27. The encoding is illustrated in FIG. 28. 'm' is encoded as 0000, 'e' is encoded as 1, etc. The resulting encoded version of 'message' becomes the bit string 00001010100100011.

Decoding a bit string into the original object can be performed either by searching the mapping table (as illustrated in FIG. 27) for symbols matching the bits of the bit string. An alternative method is to build a tree from the information in the mapping table as illustrated in FIG. 29. In this tree, each symbol is decoded by starting at the left and moving step-by-step to the right by going up if the next bit is 0 and going down if the next bit is 1 until a symbol has been reached. In this way, 0000 becomes 'm', 1 becomes 'e', 01 becomes s, etc.

For more information, see Huffman, D. (1952). "A Method for the Construction of Minimum-Redundancy Codes".

The mapping tables may be predefined. The mapping tables may be derived from some information known both at time of encoding and time of decoding. The mapping tables may be adaptive as explained in J. S. Vitter, "Design and Analysis of Dynamic Huffman Codes", Journal of the ACM, 34(4), October 1987, pp 825-845 and Donald E. Knuth, "Dynamic Huffman Coding", Journal of Algorithm, 6(2), 1985, pp 163-180.

Another method for lossless data compression is Arithmetic Coding, where symbols are encoded into intervals of rational numbers. A mapping table is constructed between input symbol and a rational number interval as illustrated in FIGS. 30 and 31. As an example, we will encode the text string "pizza" using this mapping as illustrated in FIG. 32. The first character, 'p', is encoded as a rational number in the interval 0.4 to 0.6. To encode the next character, 'i', the interval in FIG. 31 is scaled to fit in the interval 0.4 to 0.6. The character sequence "pi" is thus encoded as the rational number interval 0.44 to 0.48. This algorithm is repeated until all characters has been encoded. In this way, "pizza" becomes the interval 0.47360 to 0.47488. To convert this interval into a binary representation, the interval is first converted from decimal form to binary form as illustrated in FIG. 33. The shortest binary rational number to fit in the range is 0.011110011, from which the heading zero and dot are removed. The resulting binary encoding of "pizza" this way become 011110011. Decoding is performed by converting the binary encoding back into a rational number (0.011110011 becomes 0.474609375) and then walking through FIG. 32 from left to right again where the rational number decide which characters to decode and thus how to scale the interval in FIG. 31.

For more information, see Witten, Ian H.; Neal, Radford M.; Cleary, John G. (June 1987). "Arithmetic Coding for Data Compression".

Figures 34, 35, 36:
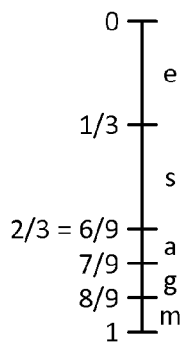

Another method for compression uses integer numbers can be constructed by operating with two variables named value and domain in integer form. A design of a mapping table to encode "message" is illustrated in FIG. 34. The characters are distributed as fractions. Often different denominators will be used and often the most common symbols will be given the least denominators in order to grant them a larger part of the encoding space. A mapping table is then constructed by using the denominator describing the granted part of the encoding space as "encoded domain" and the numerator as "encoded value" as illustrated in FIG. 35. FIG. 36 shows how "message" is then encoded. For each symbol, the encoded value and encoded domain are looked up in the mapping table. Value and Domain are then computed. Value is the previous value multiplied by Encoded Domain and added with Encoded Value. Domain is the previous value of Domain multiplied by Encoded Domain. The initial values of Value and Domain are 1. In this example, "message" is encoded into the value 53643 in the domain 59049 (i.e. 0 to 59048, both inclusive).

The value 53643 in the domain 59049 can be decoded as illustrated in FIG. 37. The fraction 53643/59049 corresponds to the symbol 'm' in FIG. 34 since it is larger than or equal to ⅝ and less than 1. This is written in the first line of FIG. 37. The Domain in the next line is the Domain from the line above divided by the Encoded Domain. The Value of the next line is the Value of the live above minus the Domain multiplied by numerator of the Fraction of the line above (i.e. 53643−(8*6561)). This algorithm is repeated until the Domain reaches 1. In this way, "message" has been decoded.

It will thus be appreciated that, in an embodiment of the invention, at least one of the compressed or encoded version of the data object and the encrypted version of the data object comprises a pair of integers representing a domain variable and a position variable, wherein the position variable represents a value within a range of possible values defined by the domain variable. Generally, compressing or encoding a data object into a pair of integers representing a domain variable and a position variable is a method allowing for converting a data object of virtually any format to be converted into a format which can be encrypted or decrypted using an encryption algorithm capable of processing a position variable within a domain.

Padding can be applied to the pair of integers by increasing the domain variable and eventually also modifying the value variable appropriately. The modification to the domain variable may reflect padding inserted in binary padding.

Mapping tables for encoding may contain more than characters. FIG. 38 illustrate a Huffman mapping table containing 5 single-character symbols along with 2 multi-character symbols and two control symbols (EOD is end-of-data marker and Repeat last means repeat last symbol). Using this mapping table, the test string "mee@gmail.com" would be encoded into 11111-1101-00-11101-100-101-01.

It will thus be appreciated that, in an embodiment of the invention, the data object comprises a plurality of characters, and wherein the step of compressing or encoding utilizes a scheme which maps one or more of the characters into a mapped partial output, and wherein the scheme is configured to identify at least one predetermined character sequence within the data object and to map any identified such predetermined character sequence into a predetermined value representing the mapped partial output. Generally, compressing or encoding character sequences can allow the compressed or ecoded version of the data object to be more compact which may facilitate less correlation between size of input and size of output and/or allow for eventual size overhead imposed by for example padding, encryption or adding authentication data without the ciphertext version becoming too big.

The encoded values, encoded intervals or encoded value and domain in mapping tables may be defined dependent on a key such that the way the algorithms compress and/or decompress changes as the key changes. Key-dependent mapping tables may be used to increase the security of the encryption method. For example, key-dependent decompression during encryption (and corresponding key-dependent compression during decryption) may make it harder for an attacker to determine and revert the padding added after the encryption step.

In preferred embodiments of the present invention, the terms "encoding" and "decoding" are distinctive relative to the terms "compression" and "decompression", in that encoding and decoding algorithms use a mapping table with fixed-size encoded symbols whereas compression and decompression algorithms use a mapping table with variable-size encoded symbols. FIG. 38 illustrates a mapping table for compression (the "encoded" column have variable sized value) whereas FIG. 39 illustrates a mapping table for encoding (the "encoded" column have value with same size).

In one embodiment of the present invention, an encoding algorithm is configured such that some encoded values are not utilized as illustrated in FIG. 39, where a message to encode is using an alphabet containing the letters "a" to "f". As a consequence, some encoded value will not appear in an encoded version of a data object (the binary values 110 and 111 in the example). Because of this, some bit string are not valid encoded bit strings as the encoder would never generate these bit strings (if non-used encoded values appear in the bit strings). If one attempts to decode an invalid bit string, the decoder will not know how to represent the non-used encoded values as a symbol and the decoding should thus fail.

Figure 40:
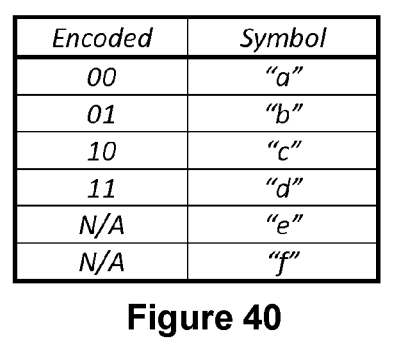

In one embodiment of the present invention, a decoding algorithm is configured such that some otherwise valid symbols will are not utilized as illustrated in FIG. 40, where the encoded bit string to decode is split into two-bit components which will then be decoded. As two bits can represent four values (00, 01, 10, and 11), two symbols of the used alphabet of 6 letters "a" to "f" are not used ("e" and "f" in this example).

One variant of encoding using a fixed-size output could be to use the method illustrated by FIG. 35 but to have a fixed encoded domain.

One advantage of using a compression algorithm to convert for example a text string of a given format into a bit string is that it can often generate a shorter bit string than the simpler encoding. One advantage of using a compression algorithm to convert for example a text string of a given format into a bit string is that the compression algorithm is not bound on any constraints to the size of the number of encoded values are illustrated in FIGS. 39 and 40.

In the following example, the input/plaintext and output/ciphertext have the same format but some restrictions are imposed on the ciphertext format.

Example: In case the input/plaintext is provided in a format which allows Unicode characters (i.e. character set which includes a wide range of characters in extend to the original US ASCII character sets, such as Russian, Arabic or Hebrew letters) but the encryption system enables the encrypted messages to use only a restricted subset of the total character set (e.g. use only ASCII characters) but still allows that the plaintext data may contain characters outside of the ASCII character set.

In this case, the solution may encompass encryption where the encoding/compressing step uses an algorithm supporting the entire Unicode character set (or a relevant subset thereof) but the decoding/decompression step only supports ASCII characters.

Application example: A database of North-American users. The vast majority of name entries in the database only uses ASCII characters. But few name entries use characters outside of the ASCII char set. If the encryption should support the entire Unicode character range, it would (in the simple/naïve implementation) use all possible output characters with an even distribution. Thus, non-ASCII characters would be very dominant in the encrypted version (since ASCII characters in count of different characters in a very small subset of the total set of available characters). This would be a contrast the non-encrypted data, where non-ASCII characters were almost non-existing.

In a more generalized version, one configuration may be used for encoding/compression and another for decoding/decompression (swapped for decryption, as shown in FIG.

3). This setup may even be used to convert from one format to another format. For example, plain text may be an e-mail, and the cipher text may be a person's name. This technique is sometimes called format-transforming encryption—the encryption transforms from one format (e.g. name using the entire Unicode character set) into another format (e.g. name restricted to ASCII character set).

The invention claimed is:

1. A computer-implemented method for performing format-preserving encryption and decryption of a data object in a first format, the data object having a variable size, the method utilizing an inner encryption algorithm which is capable of taking a variable size input and of outputting, as its output, an encrypted version of the variable size input, the method comprising:
   converting the data object to obtain a converted version of the data object in a second format compatible with the inner encryption algorithm;
   encrypting, by use of the inner encryption algorithm and at least one of a tweak and a key, the converted version of the data object to obtain an encrypted version of the data object;
   deconverting the encrypted version of the data object to obtain a deconverted version of the encrypted version of the data object in a third format;
   outputting the deconverted version of the encrypted version of the data object in the third format;
   wherein the combined steps of converting, encrypting, and deconverting are format-preserving such that the first format has at least one predetermined attribute which is reproduced or retained in the third format;
   wherein the output deconverted version of the encrypted version of the data object in the third format has a different size than the input data object in the first format;
   wherein during decryption the data object in the third format is converted into the second format and subsequently decrypted using the same at least one of the tweak and the key used during encryption to obtain a decrypted data object which is subsequently deconverted into the first format.

2. The method according to claim 1, wherein at least one of the converted version of the data object and the encrypted version of the data object comprises a bit string, the method further comprising padding at least one of the converted version of the data object and the encrypted version of the data object by adding one or more bits of padding information to the at least one of the converted version of the data object and the encrypted version of the data object prior to either one of the steps of encrypting and deconverting.

3. The method according to claim 1, wherein the data object has been derived from a data record comprising the data object and at least one associated data object, and
   wherein at least one of the steps of a: converting, b: encrypting, c: padding and d: deconverting depends on at least a portion of the associated data object or data derived from at least a portion of the associated data object.

4. The method according to claim 1, wherein at least one of the converted version of the data object and the encrypted version of the data object comprises a pair of integers representing a domain variable and a position variable,
   wherein the position variable represents a value within a range of possible values defined by the domain variable.

5. The method according to claim 1, wherein the steps of converting and deconverting utilize different schemes, such as
   different configurations of a compression and decompression algorithm,
   different configuration of an encoding and decoding algorithm,
   compression used at one step and decoding used at another step, or
   encoding used at one step and decompression used at another step.

6. The method according to claim 1, wherein the data object comprises a plurality of characters, and
   wherein the step of converting utilizes a scheme which maps one or more of the characters into a mapped partial output, and
   wherein the scheme is configured to identify at least one predetermined character sequence within the data object and to map any identified such predetermined character sequence into a predetermined value representing the mapped partial output.

7. The method according to claim 1, wherein the data object comprises a plurality of characters, and
   wherein the step of converting utilizes a scheme which maps one or more of the characters into a mapped partial output, and
   wherein the scheme is configured to identify at least one predetermined format property of the data object, and
   wherein the scheme is further configured to map the one or more characters and the format property, so as to render the converted version of the data object dependent from the one or more characters and the at least one format property.

8. The method according to claim 1, wherein the steps of a: converting, b: encrypting and c: deconverting are performed by use of a first set of configuration data by use of a first set of algorithms in steps a, b and c, the method further comprising the steps of:
   determining a format property, such as a size, of the deconverted version of the encrypted version of the data object;
   determining if the format property of the deconverted version of the encrypted version of the data object complies with a predetermined constraint; and
   if the characteristic fails to comply with the predetermined constraint:
   redoing at least one of steps a, b and c by use of second configuration data different from the first configuration data and/or
   use of second type of algorithm in at least one of steps a, b and c different from the first algorithms
   to obtain a new deconverted and encrypted version of the data object.

9. The method according to claim 1, wherein the steps of a: converting, b: encrypting and c: deconverting are performed by use of a first set of configuration data by use of a first set of algorithms in steps a, b and c, the method further comprising the steps of:
   determining a format property, such as a size, of the deconverted version of the encrypted version of the data object;
   determining if the format property of the deconverted version of the encrypted version of the data object complies with a predetermined constraint; and if the characteristic fails to comply with the predetermined constraint:
applying the encryption algorithm to the encrypted version of the data object to obtain a further encrypted version of the data object, and
decompressing the further encrypted converted version of the data object
to obtain a new deconverted and encrypted version of the data object.

10. The method according to claim 1, further comprising the steps of:
adding authentication data to at least one of the data object, the converted version of the data object, the encrypted version of the data object, and the deconverted version of the encrypted version of the data object; and
authenticating at least one of the data object, the converted version of the data object, the encrypted version of the data object, and the deconverted version of the encrypted version of the data object by verifying the authentication data added during further operations.

11. The method according to claim 1, wherein the step of encrypting and/or any preceding step is carried out in such a way to render the deconverted version of the encrypted version of the data object non-deterministic.

12. The method according to claim 1, further comprising the step of embedding a key label into the deconverted version of the encrypted version of the data object.

13. A computer-implemented method for performing format-preserving encryption and decryption of a data object in a first format, the data object having a variable size, the data object comprising a plurality of characters occurring in at least two sequences of text characters mutually separated by pre-defined format-defining characters of the first format,
wherein the plurality of characters and the format-defining characters define at least one format property of the data object in the first format, the method comprising:
converting at least one of:
the at least two sequences of text characters and the format-defining characters; and
the at least two sequences of text characters and the at least one format property to obtain an encoded set of data in a second format;
encrypting the encoded set of data by use of an inner encryption algorithm and at least one of a tweak and a key, the inner encryption algorithm being capable of taking a variable size input and of outputting, as its output, an encrypted version of the variable size input, to obtain an encrypted set of data;
deconverting the encrypted set of data to obtain a deconverted encrypted set of data in a third format, wherein the combined steps of converting, encrypting, and deconverting are format-preserving such that the third format fulfills the at least one format property of the data object in the first format;
outputting the deconverted encrypted set of data as an encrypted version of the data object in the third format;
wherein the output deconverted set of data in the third format has a different size than the input data object in the first format;
wherein during decryption the data object in the third format is converted into the second format and subsequently decrypted using the same at least one of the tweak and the key used during encryption to obtain a decrypted set of data which is subsequently deconverted into the first format.

14. A computer-implemented method for performing format-preserving encryption and decryption of a data object in a first format having predefined format properties, the data object having a variable size, the method comprising:
converting, by use of a first reversible converting algorithm, the data object to obtain a converted version of the data object in a second format;
encrypting the converted version of the data object by use of an inner encryption algorithm and at least one of a tweak and a key, the inner encryption algorithm being capable of taking a variable size input and of outputting, as its output, an encrypted version of the variable size input, to obtain an encrypted version of the data object;
deconverting, by use of a first reversible deconversion algorithm, the encrypted version of the data object to obtain a deconverted encrypted version of the data object in a third format, wherein the combined steps of converting, encrypting, and deconverting are format-preserving such that the third format fulfills the predefined format properties of the first format;
outputting the deconverted encrypted version of the data object;
wherein the first deconversion algorithm is different from a reversed version of the first converting algorithm;
wherein the output deconverted encrypted version of the data object in the third format has a different size than the input data object in the first format;
wherein during decryption the data object in the third format is converted into the second format using a second converting algorithm and subsequently decrypted using the same at least one of the tweak and the key used during encryption to obtain a decrypted data object which is subsequently deconverted using a second deconversion algorithm into the first format;
wherein the second deconversion algorithm is an inverse of the first converting algorithm and the first deconversion algorithm is an inverse of the second converting algorithm.

* * * * *